United States Patent
Li

(10) Patent No.: US 11,218,399 B2
(45) Date of Patent: *Jan. 4, 2022

(54) EMBEDDED AREA ABSTRACTION

(71) Applicant: Arista Networks, Inc., Santa Clara, CA (US)

(72) Inventor: Anthony Joseph Li, Los Altos, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/896,419

(22) Filed: Jun. 9, 2020

(65) Prior Publication Data

US 2020/0304398 A1    Sep. 24, 2020

Related U.S. Application Data

(63) Continuation-in-part of application No. 16/013,497, filed on Jun. 20, 2018, now Pat. No. 10,855,572.

(51) Int. Cl.
*H04L 12/751* (2013.01)
*H04L 12/715* (2013.01)

(52) U.S. Cl.
CPC .............. *H04L 45/02* (2013.01); *H04L 45/46* (2013.01); *H04L 45/04* (2013.01)

(58) Field of Classification Search
CPC ....... H04L 45/02; H04L 45/025; H04L 45/04; H04L 45/46
See application file for complete search history.

(56) References Cited

U.S. PATENT DOCUMENTS

| | | | |
|---|---|---|---|
| 6,349,091 B1 | 2/2002 | Li | |
| 7,177,951 B1 | 2/2007 | Dykeman et al. | |
| 7,281,057 B2 | 10/2007 | Cain | |
| 8,214,447 B2 | 7/2012 | Deslippe et al. | |
| 8,917,708 B2* | 12/2014 | Venkatachalam | H04W 8/005 370/338 |
| 8,995,303 B1 | 3/2015 | Brar et al. | |

(Continued)

FOREIGN PATENT DOCUMENTS

EP    3400678    11/2018

OTHER PUBLICATIONS

J. Moy; "OSPF Version 2"; STD 54, RFC 2328; DOI 10.17487/RFC2328, Apr. 1998; https://tools.ietf.org/html/rfc2328.

(Continued)

*Primary Examiner* — Asad M Nawaz
*Assistant Examiner* — Kai Chang
(74) *Attorney, Agent, or Firm* — Chamberlain, Hrdlicka, White, Williams & Aughtry

(57) ABSTRACT

A method and network device for embedded area abstraction. Specifically, the method and network device described herein implement the abstraction of one or more subareas of an area within a network implementing a link state protocol. Abstraction of a given subarea of a given area within a network may provide for routing using network devices in the given subarea without requiring that the network devices, in the complement of the given subarea within the given area, maintain link state information respective to the entire network topology of the given subarea.

20 Claims, 7 Drawing Sheets

(56) References Cited

U.S. PATENT DOCUMENTS

| | | | |
|---|---|---|---|
| 9,253,663 | B2 | 2/2016 | Raleigh et al. |
| 9,491,089 | B2 | 11/2016 | Bhatt et al. |
| 9,584,363 | B1 | 2/2017 | Olson |
| 9,674,193 | B1 | 6/2017 | Madasamy |
| 9,712,390 | B2 | 7/2017 | Lissack |
| 9,760,598 | B1 | 9/2017 | Holenstein et al. |
| 9,984,140 | B1 | 5/2018 | Sukumaran et al. |
| 10,218,610 | B2 | 2/2019 | Frost et al. |
| 10,379,890 | B1 | 8/2019 | Mehta et al. |
| 10,469,360 | B1 | 11/2019 | Bhat et al. |
| 10,623,285 | B1 | 4/2020 | Shevade |
| 2003/0115364 | A1 | 6/2003 | Shu et al. |
| 2003/0179707 | A1 | 9/2003 | Bare |
| 2004/0143425 | A1 | 7/2004 | Rosenberg |
| 2005/0036500 | A1 | 2/2005 | Rodeheffer et al. |
| 2005/0170852 | A1 | 8/2005 | Li et al. |
| 2005/0265260 | A1 | 12/2005 | Zinin et al. |
| 2007/0070920 | A1* | 3/2007 | Oyamada ............... H04L 41/12 370/254 |
| 2007/0124375 | A1 | 5/2007 | Vasudevan et al. |
| 2007/0280102 | A1 | 12/2007 | Vasseur et al. |
| 2009/0144443 | A1 | 6/2009 | Vasseur et al. |
| 2009/0158387 | A1 | 6/2009 | Huang |
| 2009/0245137 | A1 | 10/2009 | Hares et al. |
| 2010/0057563 | A1 | 3/2010 | Rauber et al. |
| 2010/0103846 | A1 | 4/2010 | Chiabaut et al. |
| 2010/0296414 | A1 | 11/2010 | Vohra et al. |
| 2011/0103228 | A1 | 5/2011 | Sheth et al. |
| 2011/0116369 | A1 | 5/2011 | Hu et al. |
| 2012/0087304 | A1 | 4/2012 | Porat |
| 2012/0201539 | A1 | 8/2012 | Boertjes et al. |
| 2012/0294187 | A1 | 11/2012 | Chau et al. |
| 2013/0077621 | A1 | 3/2013 | Jacob Da Silva et al. |
| 2013/0121156 | A1 | 5/2013 | Rege et al. |
| 2013/0136138 | A1 | 5/2013 | Miller et al. |
| 2013/0145461 | A1 | 6/2013 | Barton' et al. |
| 2013/0173876 | A1 | 7/2013 | Namjoshi |
| 2013/0311229 | A1 | 11/2013 | Hadar et al. |
| 2014/0010069 | A1 | 1/2014 | Abbasi et al. |
| 2014/0043956 | A1 | 2/2014 | Mirtorabi et al. |
| 2014/0219103 | A1 | 8/2014 | Vasseur et al. |
| 2014/0233422 | A1 | 8/2014 | Thubert et al. |
| 2014/0269421 | A1 | 9/2014 | Previdi et al. |
| 2014/0269725 | A1 | 9/2014 | Filsfils et al. |
| 2015/0055652 | A1 | 2/2015 | Yong et al. |
| 2015/0127789 | A1 | 5/2015 | Lissack |
| 2015/0188760 | A1 | 7/2015 | Anumala et al. |
| 2015/0350314 | A1 | 12/2015 | Miller et al. |
| 2016/0027292 | A1 | 1/2016 | Kerning |
| 2016/0094398 | A1 | 3/2016 | Choudhury et al. |
| 2016/0134482 | A1 | 5/2016 | Beshai |
| 2016/0164716 | A1 | 6/2016 | Dusi |
| 2016/0248658 | A1 | 8/2016 | Patel et al. |
| 2017/0195218 | A1 | 7/2017 | Schrum, Jr. et al. |
| 2017/0353360 | A1 | 12/2017 | Hayashitani et al. |
| 2018/0041360 | A1 | 2/2018 | Shen et al. |
| 2018/0176082 | A1 | 6/2018 | Katz et al. |
| 2018/0176093 | A1 | 6/2018 | Katz et al. |
| 2019/0104061 | A1* | 4/2019 | Zhang ............... H04L 41/042 |
| 2019/0329768 | A1 | 10/2019 | Shalev-shwartz et al. |
| 2021/0119910 | A1 | 4/2021 | Chen et al. |

OTHER PUBLICATIONS

R. Coltun et al.; "OSPF for IPv6"; RFC 5340; DOI 10.17487/RFC5340, Jul. 2008; https://tools.ietf.org/html/rfc5340.

"Information technology—Telecommunications and information exchange between systems—Intermediate System to Intermediate System intra-domain routeing information exchange protocol for use in conjunction with the protocol for providing the connectionless-mode network service (ISO 8473)"; ISO/IEC 10589:2002(E); 2002.

C. Filsfils et al.; "Segment Routing Architecture, draft-ietf-spring-segment-routing-13" Oct. 2017; https://tools.ietf.org/id/draft-ietf-spring-segment-routing-13.html.

International Search Report issued in corresponding Application No. PCT/US2019/037815, dated Jul. 26, 2019.

N. Shen et al.; "IS-IS Routing for Spine-Leaf Topology"; Internet Draft, Networking Working Group; Jan. 2, 2018; XP015124979.

T. Li, Arista Networks; "Dynamic Flooding for IS-IS"; Internet Draft, Internet Engineering Task Force; Jan. 7, 2018; XP015125062.

T. Li, Arista Networks; "Dynamic Flooding on Dense Graphs"; Internet Draft, Internet Engineering Task Force; Mar. 26, 2018.

Written Opinion issued in corresponding Application No. PCT/US2019/037815, dated Jul. 26, 2019.

Chen Futurewei et al., "Flooding Topology Computation Algorithm; draft-cc-1sr-flodding-reduction-04". Network Working Group, Jul. 8, 2019, pp. 1-9, XP015133971 (8 pages).

Chen T Li et al., "An Algorithm for Computing Dynamic Flooding Topologies; draft-chen-lsr-dynamic-flooding algorithm-00", Internet Engineering Task Force, Mar. 3, 2020, pp. 1-9, XP015138043 (9 pages).

Frank R et al., "EDFS A Novel Flooding Protocol for Multi-Hop Wireless Networks", The Seventh International Conference on Wireless On-demand Network Systems and Services; IEEE/IFIP WONS 2010, Feb. 3, 2010, pp. 99-105, XP031652457 (7 pages).

Li T et al., "Dynamic Flooding on Dense Graphs; draft-ietf-1sr-dynamic-flooding-04", Internet Engineering Task Force, Nov. 26, 2019, pp. 1-47, XP015136693 (47 pages).

* cited by examiner

EMBEDDED AREA ABSTRACTION

CROSS-REFERENCE TO RELATED APPLICATIONS

This application is a continuation-in-part of U.S. patent application Ser. No. 16/013,497, filed on Jun. 20, 2018, and entitled: "AREA ABSTRACTION EXTENSIONS TO ROUTING PROTOCOLS". Accordingly, this application claims benefit of U.S. patent application Ser. No. 16/013,497 under 35 U.S.C. § 120, which is hereby incorporated by reference in its entirety.

BACKGROUND

Networks of interconnected devices (e.g., computer networks) often include any number of network devices. Such network devices may be arranged in a network topology in order to provide connectivity between devices within and outside the network. Within such network topologies, routing protocols are often implemented that distribute certain information (e.g., network topology information) related to routing network traffic data units (e.g., packets, frames, etc.) within and/or through the network. Such information may be stored in relevant databases (e.g., link state databases) on the network devices. Inclusion of the information describing the entire network topology, or a substantial portion thereof, in such databases may reduce performance of the network, or any devices therein, as the amount of stored routing-related information increases.

DETAILED DESCRIPTION

Figure 1:
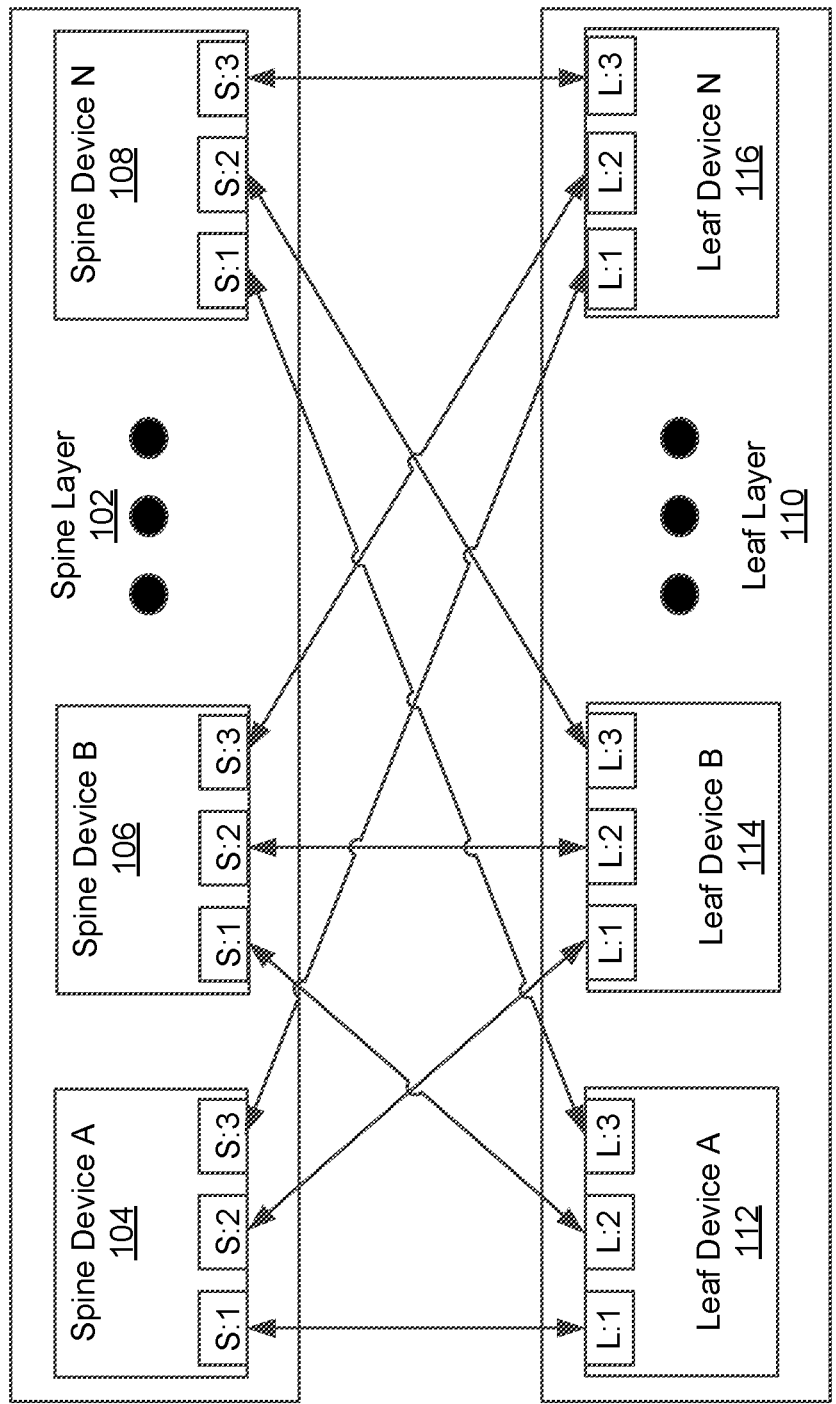
FIG. 1 shows a network topology in accordance with one or more embodiments.

Specific embodiments will now be described in detail with reference to the accompanying figures.

In general, embodiments described herein relate to a method and network device for embedded area abstraction. Specifically, one or more embodiments described herein implement the abstraction of one or more subareas of an area within a network implementing a link state protocol. Abstraction of a given subarea of a given area within a network may provide for routing using network devices in the given subarea without requiring that the network devices, in the complement of the given subarea within the given area, maintain link state information respective to the entire network topology of the given subarea.

In a link state routing protocol, such as the intermediate system to intermediate system (IS-IS) or open shortest path first (OSPF) protocols, a network may be organized into multiple logical areas. In the IS-IS protocol, for example, the network may be organized into a level 1 (L1) area, used for intra-network routing, and a level 2 (L2) area used for inter-network routing. By the same IS-IS notation, U.S. patent application Ser. No. 16/013,497, to which this application claims benefit, addresses the abstraction of the L1 area as a L2 virtual device residing and/or operating in the L2 area. Through this area abstraction, routing may be provided using network devices within the abstracted L1 area without having to include the entire topology of the abstracted L1 area in link state databases of network devices in the L2 area.

Embodiments described herein take this abstraction one step further. That is, by the above-mentioned IS-IS notation, embodiments described herein address the abstraction of a L1 subarea (also referred to as an inner L1 area) as a L1 area (also referred to as an outer L1 area) virtual device residing and/or operating in the L1 area. Through this embedded area abstraction, routing may be provided using network devices within the abstracted L1 subarea without having to include the entire topology of the abstracted L1 subarea in link state databases of network devices in the L1 area. Embodiments described herein may also function to abstract a L2 subarea (or inner L2 area) as a L2 area (or outer L2 area) virtual device residing and/or operating in the L2 area.

In one or more embodiments described herein, a network area (or generically, an area) of a network, which may be implementing a link state protocol, may encompass a subset of a set of network devices representing the network, whereas a subarea of the area may encompass a portion of the aforementioned subset of network devices that represent the area of the network. Further, the complement of a subarea, within an area, may reference network devices included in the area, however, not included in the subarea. Moreover, a subarea of an area, within a network, may be abstracted as a subarea representation node (i.e., a virtual network device) with adjacency to network devices in the complement of the subarea within the area of the network.

Figure 5:
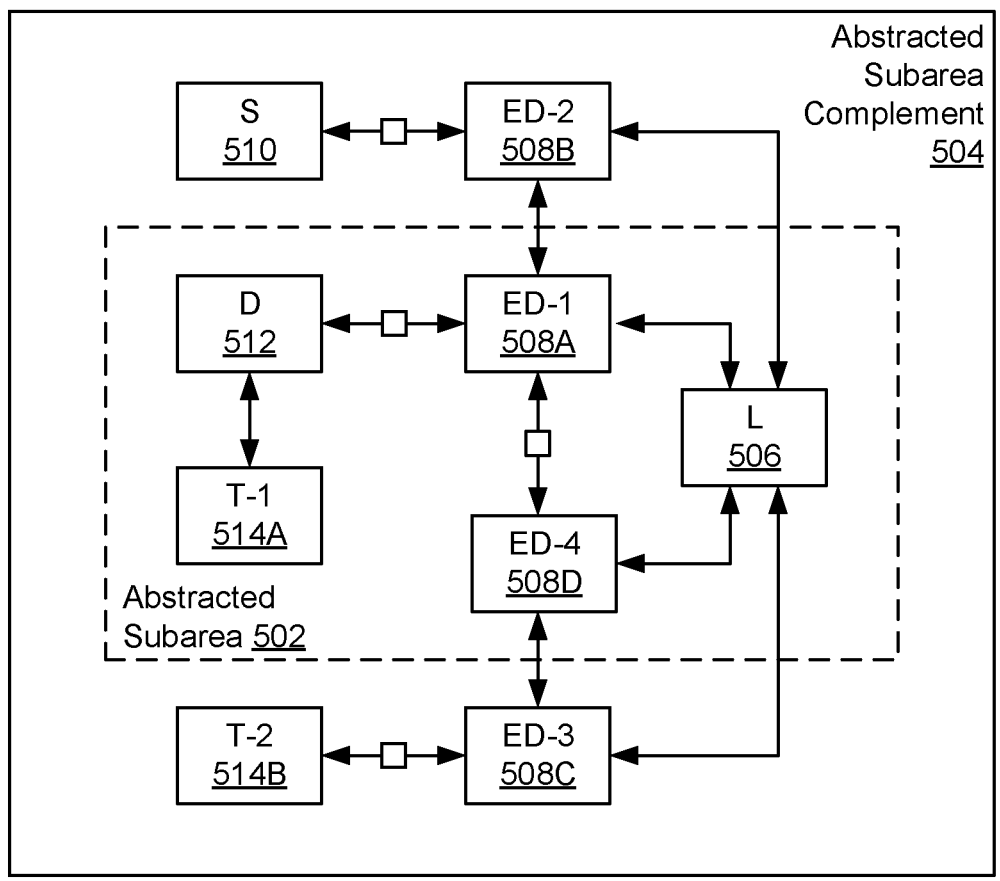
FIG. 5 shows an exemplary scenario in accordance with one or more embodiments.

One or more embodiments described herein may be directed to the abstraction of a single subarea within an area of a network (see e.g., FIG. 5). Further, one or more embodiments described herein may be directed to the abstraction of multiple, adjacent subareas within an area of a network (see e.g., FIG. 6). Moreover, one or more embodiments described herein may be directed to the abstraction of a smaller, inner subarea nested within the abstraction of a larger, outer subarea, all collectively within an area of a network (see e.g., FIG. 7).

In the following detailed description of the embodiments, numerous specific details are set forth in order to provide a more thorough understanding of the various embodiments. However, it will be apparent to one of ordinary skill in the art that the invention may be practiced without these specific details. In other instances, well-known features have not been described in detail to avoid unnecessarily complicating the description.

In the following description of FIGS. 1-7, any component described with regard to a figure, in various embodiments, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout the application, the phrase 'operatively connected' may be used to describe a connection between components. As used hereinafter, the aforementioned phrase may refer to any direct (e.g., wired directly between two or more components) or indirect (e.g., wired and/or wireless connections between any number of components connecting the operatively connected components) connection.

FIG. 1 shows a network topology in accordance with one or more embodiments. As shown in FIG. 1, the network topology (100) includes a spine layer (102) and a leaf layer (110). The spine layer (102) may include any number of spine devices, such as spine device A (104), spine device B (106), and spine device N (108). The leaf layer (110) may include any number of leaf devices, such as leaf device A (112), leaf device B (114), and leaf device N (116). Each of these network topology (100) components is described below.

In one or more embodiments, a network topology (100) is an arrangement of various elements of a network. In one or more embodiments, a network includes a collection of one or more network devices (e.g., spine devices (104, 106, 108), leaf devices (112, 114, 116)) that facilitate network connectivity for one or more operatively connected devices (e.g., computing devices, data storage devices, other network devices, etc.). As used herein, the term operatively connected, or operative connection, means that there exists between elements/components a direct or indirect connection that allows the elements to interact with one another in some way. For example, such elements may exchange information, send instructions to perform actions, cause changes in state and/or operating condition, etc. Additionally, as used herein, a network may be an entire network or any portion thereof (e.g., a logical portion of network devices within the network topology, external to the network topology, etc.). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet.

In one or more embodiments, the network topology (100) is a bipartite network topology. In one or more embodiments, a bipartite network topology is a network topology in which there are at least two sets of network devices, with connections between devices of one set and devices of another set, but no connections between devices within a given set. Examples of such network topologies include, but are not limited to, a folded three-stage Clos network topology (e.g., a spine-leaf network topology), a fat tree topology (i.e., Leiserson topology), etc. In one or more embodiments, a network topology may include network devices that are highly interconnected, with, as an example, each device in a first set of network devices being connected to each device in a second set of network devices within the network topology. In the exemplary embodiment shown in FIG. 1, the network topology (100) is a spine-leaf topology. Although FIG. 1 shows an example of a spine-leaf topology, in one or more embodiments, the network topology is not limited to being a spine-leaf topology (or the particular example shown), or any other example of a network topology set forth herein.

In one or more embodiments, when a network topology (100) is arranged as a spine-leaf topology, the network topology (100) includes a leaf layer (110) and a spine layer (102).

In one or more embodiments, a leaf layer (110) is a set of any number of network devices (e.g., leaf devices (112, 114, 116)) that provide network connectivity to any number of attached devices (not shown), such as, for example, computing devices. In one or more embodiments, a computing device is any device or any set of devices capable of electronically processing instructions and that includes, at least, one or more processors, memory, input and output device(s), and network connectivity via a leaf layer (110). Examples of computing devices include, but are not limited to, a server (e.g., a blade-server in a blade-server chassis, a rack server in a rack, etc.), a virtual machine (VM), a desktop computer, a mobile device (e.g., laptop computer, smart phone, personal digital assistant, tablet computer, and/or any other mobile computing device), and/or any other type of computing device with the aforementioned requirements. Other examples of devices for which a leaf layer (110) may provide network connectivity include, but are not limited to, data storage devices (not shown), other network devices (e.g., wireless routers) (not shown), media devices (e.g., televisions) (not shown), etc.

In one or more embodiments, a spine layer (102) is a set of any number of network devices (e.g., spine devices (104, 106, 108)) that provide, at least, network connectivity between network devices of a leaf layer (110). In one or more embodiments, each leaf device (112, 114, 116) within a leaf layer (102) is operatively connected to each spine device (104, 106, 108) within a spine layer (102), and each spine device (104, 106, 108) within a spine layer is operatively connected to each leaf device (112, 114, 116) within a leaf layer (102).

In one or more embodiments, each leaf device (112, 114, 116) and each spine device (104, 106, 108) is a network device. In one or more embodiments, a network device may be a physical device that includes and/or may operatively connected to persistent storage (not shown), memory (e.g., random access memory (RAM)) (not shown), one or more processor(s) (e.g, integrated circuits) (not shown), and two or more physical network interfaces (which may also be referred to as ports).

As shown in FIG. 1, examples of such interfaces include ports S:1, S:2, and S:3 on each spine device (104, 106, 108) and ports L:1, L:2, and L:3 on each leaf device (112, 114, 116). Although not shown in FIG. 1, leaf devices (112, 114, 116) and/or spine devices (104, 106, 108) may have any number of additional ports for connecting to any number of other devices. In one or more embodiments, the one or more processors of a network device (e.g., a central processing unit) are separate components from a network chip, one or more of which may also be components of a network device.

In one or more embodiments, the network device also includes any number of network chips. In one or more embodiments, a network chip is any hardware (e.g., circuitry), software, firmware, and/or combination thereof that includes functionality to receive, process, and/or transmit network traffic data units in accordance with one or more embodiments. In order to perform such functionality, a network chip may include any number of components. Such components may include, but are not limited to, one or more processors, one or more buffers (e.g., for implementing receive and/or transmit queues, such as virtual output queues (VOQs)), any type or amount of non-volatile storage, and/or any type or amount of volatile storage (e.g., RAM). A network chip may also include and/or be operatively connected to any number of physical network interfaces (e.g., L:1, L:2, L:3, S:1, S:2, or S:3 as shown in FIG. 1) of a network device. Such interfaces may provide a path external to the network device (e.g., to other devices), and/or may be operatively connected to other components internal to the network device (100), and each such interface may be an ingress and/or egress interface.

In one or more embodiments, a network device includes functionality to receive network traffic data units (e.g., frames, packets, etc.) at any of the physical network interfaces (i.e., ports) of the network device and to process the network traffic data units to determine whether to: (i) drop the network traffic data unit; (ii) process the network traffic data unit; and/or (iii) transmit the network traffic data unit, based on the processing, from a physical network interface or port on the network device in accordance with one or more embodiments described herein.

As a non-limiting example, a network chip may be hardware that receives network traffic data units at an ingress port, and determines out of which egress port on the network device (100) to forward the network traffic data units such as, for example, media access control (MAC) frames that may include Internet Protocol (IP) packets.

In one or more embodiments, a network device (e.g., leaf devices (112, 114, 116), spine devices (104, 106, 108)) may include functionality to store (e.g., in persistent storage, in memory, etc.), any number of data structures for facilitating operation of at least some aspects of the network device. An example of such a data structure is a link state database (not shown). Any network device described herein may include any number of link state databases.

In one or more embodiments, a link state database is a data repository for storing link state information received from neighboring network devices via the ports of a network device. In one or more embodiments, a data repository is any type of storage unit(s) and/or device(s) (e.g., a file system, database, collection of tables, or any other storage mechanism) for storing data. Further, the data repository may include multiple different storage units and/or devices. The multiple different storage units and/or devices may or may not be of the same type or located at the same physical site. In one or more embodiments, the network device data repository (110) includes all or any portion of the persistent and/or non-persistent storage of the network device (100) as described above.

In one or more embodiments, network devices within a network topology (100) (or a portion thereof (e.g., a logical area within the topology)) share link state information using any of a variety of types data units (e.g., packets, frames, messages, advertisements, etc.), which may be referred to herein as link state packets (LSPs). Such LSPs may be sent from one network device to directly connected adjacent network devices, and may include information related to the state of links between the sending network device and other devices to which the sending network device is operatively connected.

When a LSP that includes link state information is received at a network device from an adjacent network device, the receiving network device may store the information in at least one of its link state databases and, in turn, propagate the LSP to its own adjacent network devices. Such sharing of link state information between network devices may occur within a network topology implementing an interior gateway protocol (IGP). Examples of an IGP include, but are not limited to, intermediate system to intermediate system (IS-IS) and open shortest path first (OSPF), each of which may be referred to as a type of IGP known as a link state routing protocol.

In one or more embodiments, when a link-state routing protocol is implemented within a given network topology (or any portion therein), each device participating in the link-state routing topology receives, directly or indirectly, link state information from other devices in the network topology, or logical area within the network topology. In one or more embodiments, each network device uses the received information to build a mapping of the connectivity of network devices within the topology and/or logical area. Information relating to the mapping may be stored in a link state database.

A network device with a complete mapping of the connectivity of network devices within a topology or logical area may then use any scheme (e.g., the Dijkstra algorithm, segment routing, etc.) to determine a path (e.g., shortest path, path with the least cost, etc.) from itself to other network devices in the network topology or logical area, and such information may be stored in the link state database and/or used to program other portions of the network device (e.g., a routing information base) with information to be used, for example, when processing a received network traffic data unit. In one or more embodiments, the map of connectivity should be the same on each network device in a topology or logical area, unless one or more network devices have a change in information related to the state of one or more links. Accordingly, once a mapping has been determined, link state information may be sent from a given network device only when a change to link state information of any link of a network device occurs.

As discussed above, link state routing protocols may organize a network into logical areas. For example, in the IS-IS protocol, a network may be organized into a level 1 (L1) area, used for intra-network routing, and a level 2 (L2) area, used for inter-network routing. Additionally, a network implementing IS-IS may also include any number of network devices that are connected to both L1 devices and L2 devices. Said another way, some devices may be referred to as participating in both L1 and L2, and thus be L1/L2 devices. Devices participating on more than one logical area (in any link state routing protocol) may also be referred to as area edge devices. In one or more embodiments, devices in a spine layer (102) may be grouped into a first area (e.g., an IS-IS level 1 area), and devices in a leaf layer (110) may be grouped into a second area (e.g., an IS-IS level 2 area), with any number of area edge devices participating in both the first area and the second area, each of which may be either leaf or spine devices. Network areas are discussed further in the description of FIG. 2, below.

In one or more embodiments, a network device also includes software and/or firmware stored in any network device storage (not shown) and/or network device memory (not shown) (i.e., non-transitory computer readable mediums). Such software may include instructions which, when executed by the one or more processors (not shown) of the network device, cause the one or more processors to perform operations in accordance with one or more embodiments. The software instructions may be in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform functionality related to embodiments described herein. The functionality of a network device is not limited to the aforementioned examples.

Examples of a network device include, but are not limited to, a network switch, a router, a multilayer switch, a fibre channel device, an InfiniBand® device, etc. A network device is not limited to the aforementioned specific examples.

While FIG. 1 shows a configuration of components, other network topology (100) configurations may be used without departing from the scope. For example, the network topology (100) may be any network topology other than the spine-leaf topology shown in FIG. 1. As another example, the quantity of network devices in the spine layer may be less (or more) than the quantity of network devices in the leaf layer. As another example, each leaf device and each spine device may have any number of additional ports for connecting to any number of other devices, or that may not be connected to any other device at a given time. Accordingly, embodiments disclosed herein should not be limited to the configuration of components shown in FIG. 1.

Figure 2:
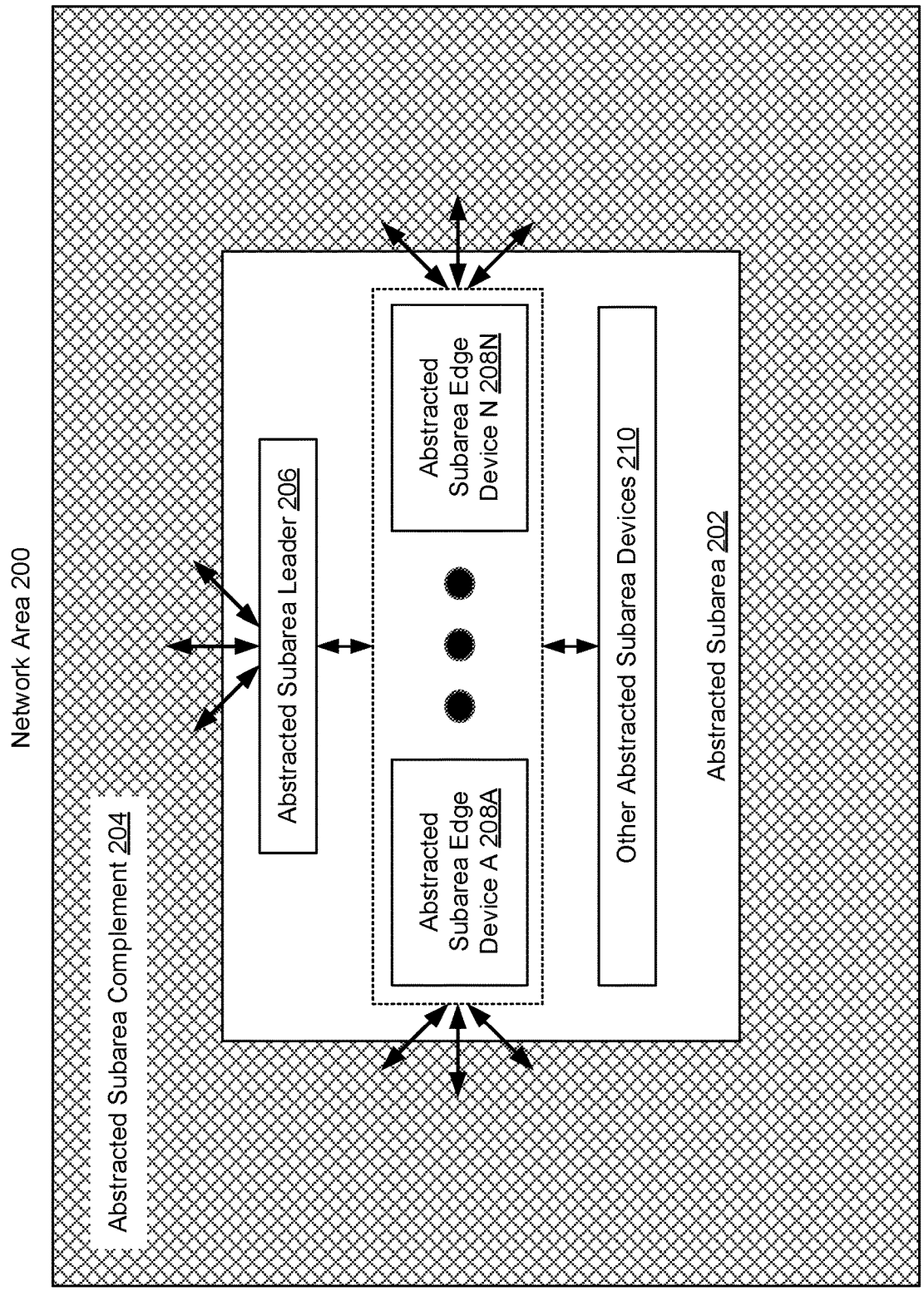
FIG. 2 shows a network area in accordance with one or more embodiments.

FIG. 2 shows a network area in accordance with one or more embodiments. The network area (200) may represent a logical area of a network (not shown) that may have been divided into multiple logical areas by a link state protocol (e.g., Intermediate System to Intermediate System (IS-IS), Open Shortest Path First (OSPF), etc.). Accordingly, the network area (200) may encompass a collection of interconnected network devices (not shown) and/or other devices (i.e., non-network devices) (e.g., computing devices), which may collectively embody a subset of the superset of interconnected devices (i.e., network devices and/or other devices) implementing the network. Further, in a simplest embodiment, the network area (200) may include an abstracted subarea (202) and an abstracted subarea complement (204), where the former may include, but is not limited to, an abstracted subarea leader (206), any number of abstracted subarea edge devices (208A-208N), and any number of other abstracted subarea devices (210). Each of these network area (200) components is described below.

In one or more embodiments described herein, the abstracted subarea (202) may refer to a logical subarea of the network area (200) that may include any number of interconnected network devices (not shown) for facilitating intra-network routing. For example, the abstracted subarea (202) may represent a portion (or subset) of a level 1 (L1) area of a network implementing the IS-IS link state routing protocol. By way of another example, the abstracted subarea (202) may represent a portion or subset of a backbone area (i.e., area 0) of a network implementing the OSPF link state routing protocol. In one or more other embodiments described herein, the abstracted subarea (202) may refer to a logical subarea of the network area (200) that may include any number of interconnected network devices (not shown) for facilitating inter-network routing. For example, the abstracted subarea (202) may represent a portion (or subset) of a level 2 (L2) area of a network implementing the IS-IS link state routing protocol. As another example, the abstracted subarea (202) may represent a portion or subset of a standard (i.e., non-backbone) area (i.e., any area other than area 0) of a network implementing the OSPF link state routing protocol.

In one or more embodiments described herein, the network devices in the abstracted subarea (202) may include a subset of network devices forming a spine layer of a network topology (e.g., spine layer (102) of FIG. 1) and, as such, may provide network connectivity between any number of network devices included in the abstracted subarea complement (204) (i.e., any other subset or remainder of network devices forming the spine layer of the network topology). In one or more other embodiments described herein, the network devices in the abstracted subarea (202) may include a subset of network devices forming a leaf layer of a network topology (e.g., leaf layer (110) of FIG. 1) and, as such, may provide network connectivity between any number of network devices included in the abstracted subarea complement (204) (i.e., any other subset or remainder of network devices forming the leaf layer of the network topology).

In one or more embodiments described herein, network devices (not shown) in the abstracted subarea (202) may operatively connect to, at least, any number of network devices and/or other devices (i.e., non-network devices) (e.g., computing devices) residing in the abstracted subarea complement (204) and any number of network devices that participate in both the abstracted subarea (202) and abstracted subarea complement (204), such as the abstracted subarea leader (206) and the abstracted subarea edge device(s) (208A-208N) (described below).

In one or more embodiments described herein, the abstracted subarea complement (204) may refer to a logical subarea of the network area (200) that may include any number of interconnected network devices (not shown) not residing in the abstracted subarea (202), which may facilitate intra-network routing. For example, the abstracted subarea complement (204) may represent a remaining portion (or subset) (i.e., excluded from the abstracted subarea (202)) of a level 1 (L1) area of a network implementing the IS-IS link state routing protocol. By way of another example, the abstracted subarea complement (204) may represent a remaining portion or subset (i.e., excluded from the abstracted subarea (202)) of a backbone area (i.e., area 0) of a network implementing the OSPF link state routing protocol. In one or more other embodiments described herein, the abstracted subarea complement (204) may refer to a logical subarea of the network area (200) that may include any number of interconnected network devices (not shown) not residing in the abstracted subarea (202), which may facilitate inter-network routing. For example, the abstracted subarea complement (204) may represent a remaining portion (or subset) (i.e., excluded from the abstracted subarea (202)) of a level 2 (L2) area of a network implementing the IS-IS link state routing protocol. As another example, the abstracted subarea complement (204) may represent a remaining portion or subset (i.e., excluded from the abstracted subarea (202)) of a standard (i.e., non-backbone) area (i.e., any area other than area 0) of a network implementing the OSPF link state routing protocol.

In one or more embodiments described herein, the abstracted subarea complement (204) may further refer to a logical subarea of the network area (200) that may include any number of interconnected network devices (not shown)

not residing in the abstracted subarea (202), which may facilitate routing of network traffic data units that may be received from and/or sent to network devices and/or other devices (i.e., non-network devices) (e.g., computing devices) residing outside the network area (200). By way of examples, these network devices and/or other devices, residing external to the network area (200), may include rack servers directly connected to one or more top-of-rack switches residing in the abstracted subarea complement (204), top-of-rack switches operatively connected to one or more other network devices residing in the abstracted subarea complement (204), or mobile computing devices operatively connected to one or more network devices residing in the abstracted subarea complement (204) via, at least in part, the Internet.

In one or more embodiments described herein, the network devices in the abstracted subarea complement (204) may include a remaining subset of network devices (i.e., excluded from the abstracted subarea (202)) forming a spine layer of a network topology (e.g., spine layer (102) of FIG. 1) and, as such, may provide network connectivity between any number of network devices included in the abstracted subarea (202). In one or more other embodiments described herein, the network devices in the abstracted subarea complement (204) may include a remaining subset of network devices (i.e., excluded from the abstracted subarea (202)) forming a leaf layer of a network topology (e.g., leaf layer (110) of FIG. 1) and, as such, may provide network connectivity between any number of network devices included in the abstracted subarea (202).

In one or more embodiments described herein, network devices (not shown) in the abstracted subarea complement (204) may operatively connect to, at least, any number of network devices and/or other devices (i.e., non-network devices) (e.g., computing devices) residing in the abstracted subarea (202) and any number of network devices that participate in both the abstracted subarea (202) and abstracted subarea complement (204), such as the abstracted subarea leader (206) and the abstracted subarea edge device(s) (208A-208N) (described below).

In one or more embodiments described herein, the abstracted subarea leader (206) may represent a network device residing in the abstracted subarea (202), which may be elected using any scheme for electing a leader within a network, a network topology, or any logical subset thereof. The abstracted subarea leader (206) may have abstracted subarea complement (204) adjacency with any number of abstracted subarea edge devices (208A-208N), and may operatively connect to any number of network devices and/or other devices (i.e., non-network devices) (e.g., computing devices) residing in the abstracted subarea complement (204). Further, the abstracted subarea leader (206) may represent a network device elected to represent the abstracted subarea (202) by aggregating information from abstracted subarea (202) link state packets (LSPs) received from abstracted subarea edge devices (208A-208N), constructing an abstracted subarea (202) representation node LSP using such information, and distributing the abstracted subarea (202) representation node LSP to network devices residing in the abstracted subarea complement (204), thereby injecting connectivity information relating to the abstracted subarea (202) representation node into the abstracted subarea complement (204) link state database of network devices in the abstracted subarea complement (204). Election of the abstracted subarea leader (206), as well as construction and distribution of the abstracted subarea representation node LSP, are discussed further in the description of FIG. 3, below.

In one or more embodiments described herein, an abstracted subarea edge device (208A-208N) may represent any network device residing in the abstracted subarea (202) that has at least one connection to a network device or other device (i.e., non-network device) (e.g., computing device) residing in the abstracted subarea complement (204). An abstracted subarea edge device (208A-208N) may include an abstracted subarea (202) link state database (not shown) and an abstracted subarea complement (204) link state database (not shown). Furthermore, an abstracted subarea edge device (208A-208N) may include functionality to share abstracted subarea (202) LSPs with one or more network devices and/or other devices (i.e., non-network devices) (e.g., computing devices) residing in the abstracted subarea (202), as well as with one or more network devices and/or other devices residing in the abstracted subarea complement (204). An abstracted subarea edge device (208A-208N) may also populate its link state databases using the aforementioned LSPs received from other network devices and/or other devices residing in the respective logical subareas—i.e., abstracted subarea (202) or abstracted subarea complement (204). Moreover, each abstracted subarea edge device (208A-208N) may receive, directly or indirectly, an abstracted subarea (202) representation node identifier originating from the abstracted subarea leader (206), which may be populated into the abstracted subarea (202) link state database on the abstracted subarea edge device (208A-208N). Additionally, each abstracted subarea edge device (208A-208N) may maintain an abstracted subarea complement (204) adjacency with the abstracted subarea leader (206).

In one or more embodiments described herein, the other abstracted subarea device(s) (210) may represent any non-network device(s) (e.g., computing device(s)) residing in the abstracted subarea (202). By way of examples, the other abstracted subarea device(s) (210) may include rack servers directly connected to one or more top-of-rack switches residing in the abstracted subarea (202), or mobile computing devices operatively connected to one or more network devices residing in the abstracted subarea (202) via, at least in part, the Internet. Further, the other abstracted subarea device(s) (210) may serve as source(s) and/or destination(s) of one or more network traffic data units, which may be (or may have been) routed to and/or from other computing devices, and through network devices, residing within the abstracted subarea (202), the abstracted subarea complement (204), or outside the network area (200).

While FIG. 2 shows a configuration of components, other network area (200) configurations may be used without departing from the scope. For example, the network area (200) may include two or more abstracted subareas (not shown)—each with their own elected abstracted subarea leader (not shown) and set of abstracted subarea edge devices (not shown)—forming an abstracted subarea union (not shown) and an abstracted subarea union complement (see e.g., FIG. 6). By way of another example, the network area (200) may further include another abstracted subarea (not shown) embedded or nested within the abstracted subarea (202) (see e.g., FIG. 7).

Figure 3:
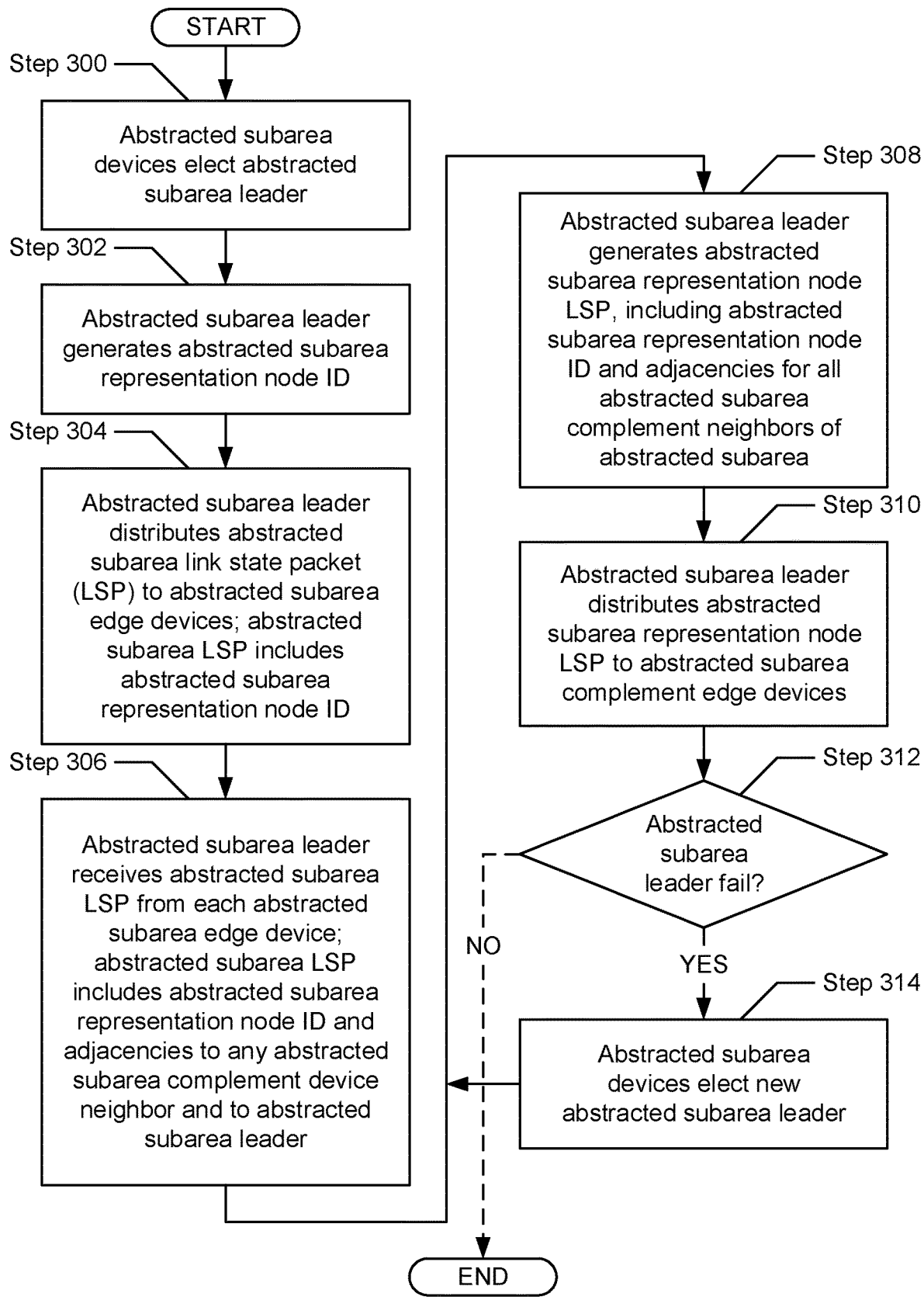
FIG. 3 shows a flowchart describing a method for abstracting subareas within a network area in accordance with one or more embodiments.

FIG. 3 shows a flowchart describing a method for abstracting subareas within a network area in accordance with one or more embodiments. The various steps outlined below may be performed by an abstracted subarea leader of an abstracted subarea of a network area (see e.g., FIG. 2).

Further, while the various steps in the flowchart are presented and described sequentially, one of ordinary skill will appreciate that some or all steps may be executed in different orders, may be combined or omitted, and some or all steps may be executed in parallel.

Turning to FIG. 3, in Step 300, an abstracted subarea leader, of an abstracted subarea of a network area (see e.g., FIG. 2), is elected. That is, in one or more embodiments, once one or more link state databases, including connectivity information within one or more logical subareas, has/have been built on each network device residing within the abstracted subarea (i.e., an initial convergence has occurred), the abstracted subarea leader may be elected from among the network devices. The abstracted subarea leader election may occur using any scheme for electing a single network device from among the network devices residing in the abstracted subarea. Such schemes may include any manner of indicating a leader priority, which may be any identifier capable of indicating a relative priority level from among a group of network devices and related to which network device should be an abstracted subarea leader network device.

As an example, in one or more embodiments, each network device may advertise a leader priority, and the network device with the numerically highest leader priority may be elected as the abstracted subarea leader. In one or more other embodiments, if more than one network device advertises the same highest leader priority, an election between such network devices may be made using any other identifying information associated with the network devices. For example, from among the network devices advertising the same highest leader priority, the elected abstracted subarea leader may be the network device with the numerically highest system identifier, network (e.g., Internet Protocol (IP)) address, router identifier, etc.

In Step 302, an abstracted subarea representation node identifier (ID) is generated by the abstracted subarea leader (elected in Step 300). In one or more embodiments, the abstracted subarea representation node ID may refer to any information that identifies an abstracted subarea representation node (i.e., a virtual network device), which may be used as an abstraction of the abstracted subarea of the network area. For example, the abstracted subarea representation node ID may take form as a numerical value expressed through a series of binary (i.e., 1 or 0) bits that may be included in a type-length-value (TLV) encoded portion of an abstracted subarea link state packet (LSP).

In Step 304, the abstracted subarea representation node ID (generated in Step 302) is distributed, by the abstracted subarea leader (elected in Step 300), to any number of abstracted subarea edge devices (see e.g., FIG. 2). Specifically, in one or more embodiments, the abstracted subarea representation node ID may be distributed as part of an abstracted subarea LSP to abstracted subarea network devices (i.e., network devices residing in the abstracted subarea of the network area) that may be adjacent (or neighbor adjacent) to the abstracted subarea leader. Because the abstracted subarea network devices implement a link state routing protocol (e.g., Intermediate System to Intermediate System (IS-IS) or Open Shortest Path First (OSPF)), the abstracted subarea network devices may each store the abstracted subarea representation node ID in an abstracted subarea link state database maintained thereon and, subsequently, re-distribute the abstracted subarea LSP (including the abstracted subarea representation node ID) to adjacent abstracted subarea network devices other than that from which the abstracted subarea LSP had been received.

Thus, each network device (residing in the abstracted subarea) may ultimately receive the abstracted subarea LSP, and may store the abstracted subarea representation node ID in their respective abstracted subarea link state databases.

In one or more embodiments, because the abstracted subarea edge devices also participate in the abstracted subarea, the abstracted subarea edge devices may also receive the abstracted subarea LSP and, subsequently, may store the enclosed abstracted subarea representation node ID in a respective abstracted subarea link state database. That is, the abstracted subarea edge devices may each receive the abstracted subarea LSP (including the abstracted subarea representation node ID) either directly from the abstracted subarea leader (elected in Step 300) if the abstracted subarea edge device happens to be abstracted subarea adjacent to the abstracted subarea leader, or indirectly as members of the abstracted subarea link state routing protocol scheme. Accordingly, the abstracted subarea leader may be considered to advertise the existence of the abstracted subarea representation node ID to the abstracted subarea edge devices by way of an abstracted subarea LSP, including the abstracted subarea representation node ID.

In Step 306, any number of abstracted subarea LSPs are received by the abstracted subarea leader (elected in Step 300) from the abstracted subarea edge devices. That is, in one or more embodiments, based on an identification of the existence of an abstracted subarea representation node ID (distributed in Step 304) in their respective abstracted subarea link state database, each abstracted subarea edge device may construct an abstracted subarea LSP to be distributed to the abstracted subarea leader. An abstracted subarea LSP, constructed by a given abstracted subarea edge device, may include adjacencies of the given abstracted subarea edge device to any abstracted subarea complement (see e.g., FIG. 2) network devices and to the abstracted subarea leader, as well as the abstracted subarea representation node ID (enclosed via the received abstracted subarea LSP). Each abstracted subarea edge device may then transmit its respective abstracted subarea LSP to the abstracted subarea leader.

In Step 308, an abstracted subarea representation node LSP is generated by the abstracted subarea leader (elected in Step 300). That is, in one or more embodiments, the abstracted subarea leader may use the abstracted subarea LSP (received from the various abstracted subarea edge devices) to generate the abstracted subarea representation node LSP. More specifically, the abstracted subarea representation node LSP may be generated by constructing a LSP that includes the abstracted subarea representation node ID (generated in Step 302) and all the abstracted subarea complement adjacencies of the various abstracted subarea edge devices. Accordingly, the abstracted subarea representation node LSP may represent all of the adjacencies of the abstracted subarea to network devices residing in the abstracted subarea complement.

In Step 310, the abstracted subarea representation node LSP (generated in Step 308) is distributed, by the abstracted subarea leader (elected in Step 300), to any number of abstracted subarea complement network devices (i.e., network devices residing in the abstracted subarea complement of the network area). In one or more embodiments, the abstracted subarea representation node LSP may be distributed using any distribution scheme implemented by an link state routing protocol. For example, the abstracted subarea representation node LSP may be flooded throughout the abstracted subarea complement via successive distributions to abstracted subarea complement neighbors, beginning with the abstracted subarea leader. Each abstracted subarea complement network device that receives the abstracted subarea representation node LSP may subsequently store the enclosed information in their respective abstracted subarea complement link state database. The abstracted subarea complement network devices may then advertise an adjacency to the abstracted subarea representation node (i.e., virtual network device) rather than any specific one or more abstracted subarea edge device(s).

Accordingly, in one or more embodiments, any network traffic data unit received by an abstracted subarea complement network device, which may be destined for a network device or other device (i.e., non-network device) (e.g., computing device) reachable through the network area topology, may be routed through the abstracted subarea representation node (i.e., the abstracted subarea). For example, a network traffic data unit may be received by an abstracted subarea complement network device, and then routed to an abstracted subarea edge device. The abstracted subarea edge device may then route the network traffic data unit through the abstracted subarea to another abstracted subarea edge device, from which the network traffic data unit may be further routed towards a final destination.

In Step 312, a determination is made as to whether the abstracted subarea leader (elected in Step 300) has failed. The abstracted subarea leader may be determined to have failed using any scheme for determining that a network device has failed. For example, the abstracted subarea leader may be determined to have failed by any one or more other network devices inside or outside the network area that stop receiving some form of expected communication (e.g., periodic heartbeat protocol packets) from the abstracted subarea leader. Accordingly, in one or more embodiments, if it is determined that the abstracted subarea leader has failed, then the process proceeds to Step 314. On the other hand, in one or more other embodiments, if it is alternatively determined that the abstracted subarea leader has not failed, then the process alternatively ends. Further, although the basic process is shown to end in FIG. 3 if the abstracted subarea leader has not failed, one having ordinary skill in the relevant art will appreciate that the process may actually continue while the network (or network area) topology exists and is configured to implement one or more embodiments described herein. Accordingly, the abstracted subarea leader may continue to periodically receive abstracted subarea LSPs from the abstracted subarea edge devices, generate the abstracted subarea representation node LSP, and distribute the abstracted subarea representation node LSP to the abstracted subarea complement network devices unless, at some point, the abstracted subarea leader is determined to have failed.

In Step 314, upon determining (in Step 312) that the abstracted subarea leader (elected in Step 300) has failed, a new abstracted subarea leader is elected. In one or more embodiments, the election of the new abstracted subarea leader may be substantially similar to the election of the abstracted subarea leader discussed above in the description of Step 300. Further, once the new abstracted subarea leader has been elected, the process returns to Step 308, where the abstracted subarea representation node LSP is generated and distributed to any number of abstracted subarea complement network devices. Although not shown in FIG. 3, upon determining (in Step 312) that the abstracted subarea leader (elected in Step 300) has failed, the process may alternatively return to Step 302 to begin the process of generating an abstracted subarea representation node ID.

Figure 4:
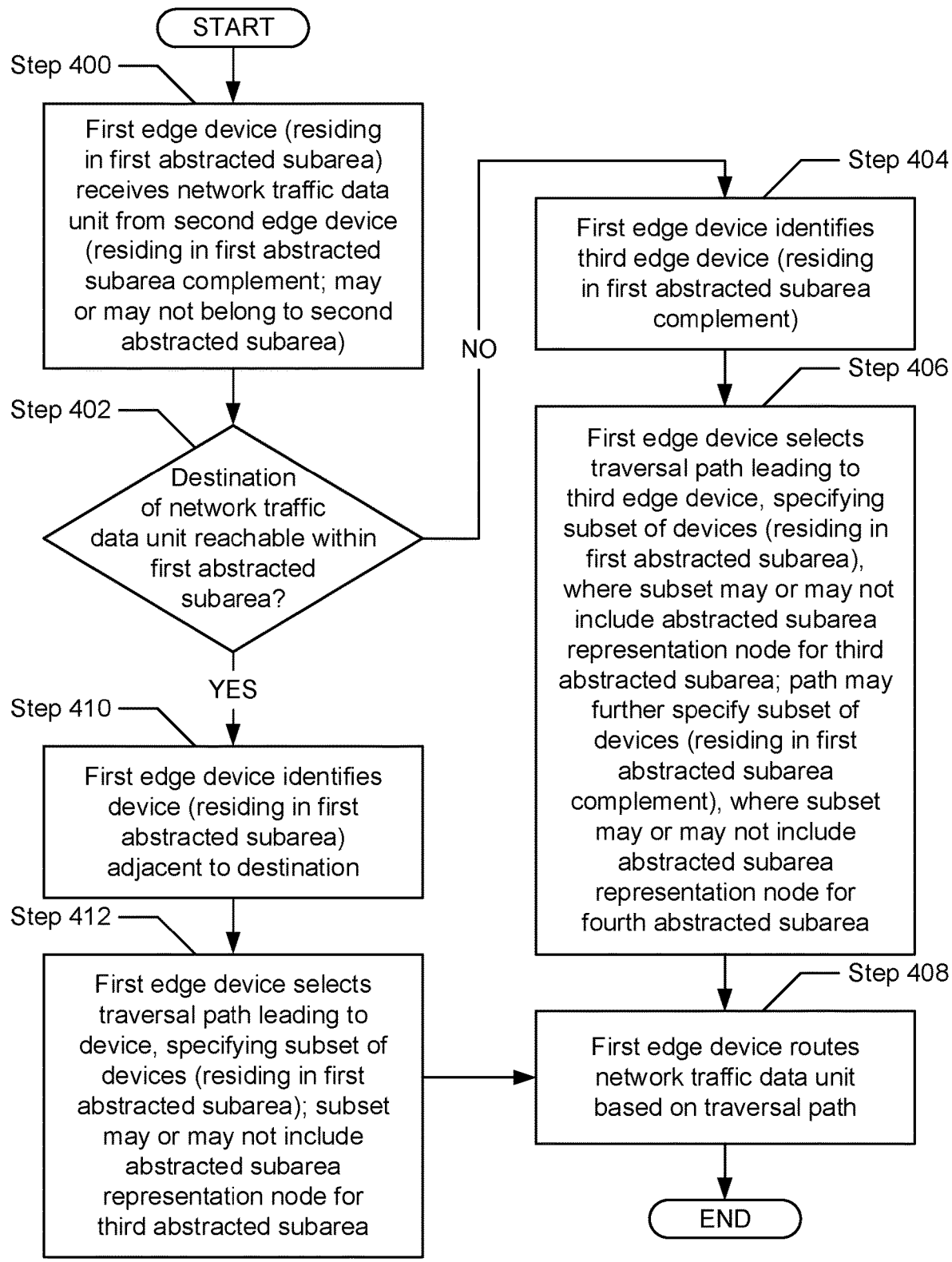
FIG. 4 shows a flowchart describing a method for routing network traffic in accordance with one or more embodiments.

FIG. 4 shows a flowchart describing a method for routing network traffic in accordance with one or more embodiments. The various steps outlined below may be performed by an abstracted subarea edge device of an abstracted subarea of a network area (see e.g., FIG. 2). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, a first edge (network) device receives a network traffic data unit (e.g., frame, packet, datagram, etc.) from a second edge (network) device. In one or more embodiments, the first edge device may reside in a first abstracted subarea (i.e., a first logical subset of interconnected network devices and/or other devices) within a network area (see e.g., FIG. 2). Meanwhile, the second edge device may reside in a first abstracted subarea complement within the network area (i.e., a remainder of interconnected network devices and/or other devices in the network area that excludes the aforementioned first logical subset). Furthermore, in residing outside the first abstracted subarea, the second edge device may or may not belong to (i.e., reside in) a second abstracted subarea (i.e., a second logical subset of interconnected network devices and/or other devices) within the network area.

In Step 402, the first edge device makes a determination as to whether a destination of the network traffic data unit is reachable within the first abstracted subarea of the network area. The determination may entail examining header information of the network traffic data unit to identify a destination address specified therein. The destination address may conform to the standard(s) employed by the link state protocol implemented by the network or network topology. For example, in a network implementing the IS-IS link state protocol, the destination address (as well as any other address for any other computing device or network device in the network) may resemble a network entity title (NET). A NET may refer to a network addressing format that may include, but is not limited to, an area identifier assigned to a logical area of the network in which the device (i.e., network or computing device) associated with the NET resides; and a system identifier assigned to the aforementioned device, which may uniquely distinguish the device within the logical area of the network associated with the area identifier.

Derivatively, the destination address for a destination computing device (or any other address for any other device) residing in a given network area may include, but is not limited to, a subarea identifier assigned to a logical portion or subset (e.g., abstracted subarea (202) or abstracted subarea complement (204) in FIG. 2) of the given network area, in which the destination computing device (or any other device) may reside; and a system identifier assigned to the destination computing device (or any other device), which may serve to uniquely distinguish the destination computing device (or any other device) within the logical portion or subset of the given network area associated with the subarea identifier.

Based on the above, the determination may further entail comparing the subarea identifier portion of the destination address against a subarea identifier associated with the logical portion (or subset) (i.e., subarea) within which the first edge device resides—i.e., a first abstracted subarea identifier associated with the first abstracted subarea. Subsequently, in one or more embodiments, should the subarea identifier portion of the destination address match the first abstracted subarea identifier, then the destination of the network traffic data unit resides (and therefore, is reachable)

within the first abstracted subarea of the network area and, accordingly, the process proceeds to Step 410. On the other hand, in one or more other embodiments, should the subarea identifier portion of the destination address alternatively mismatch the first abstracted subarea identifier, then the destination of the network traffic data unit resides outside (and therefore, is unreachable within) the first abstracted subarea of the network area and, accordingly, the process alternatively proceeds to Step 404.

In Step 404, upon determining (in Step 402) that the destination of the network traffic data unit (received in Step 400) is not reachable within the first abstracted subarea of the network area, the first edge device identifies a third edge (network) device. In one or more embodiments, the third edge device may reside in the first abstracted subarea complement. As contemplated above (see Step 400), the first abstracted subarea complement may or may not include a second abstracted subarea and/or other (i.e., third, fourth, etc.) abstracted subareas. Accordingly, the first abstracted subarea complement in entirety, or any singular other non-first abstracted subarea therein (if any), may be associated with the subarea identifier embedded in the destination address of the network traffic data unit destination. Further, identification of the third edge device may entail the first edge device using its first abstracted subarea complement link state database to select a first abstracted subarea complement adjacency (i.e., the third edge device) along a shortest-path route to the destination of the network traffic data unit.

In Step 406, the first edge device selects a traversal path that leads to the third edge device (identified in Step 404). In one or more embodiments, the traversal path may specify any subset of network devices (i.e., edge and/or non-edge devices), which may reside in the first abstracted subarea. Further, should the traversal path extend through one or more abstracted subareas nested within the first abstracted subarea (see e.g., FIG. 7), then the subset of network devices, specified by the traversal path, may include one or more abstracted subarea representation nodes, respectively. Each abstracted subarea representation node may refer to a virtual network device that may be used as an abstraction of a respective logical portion (or subset) of the network area—i.e., in the aforementioned case, a virtual network device abstracting a subarea nested within the first abstracted subarea (if any).

In one or more embodiments, the above-mentioned traversal path may or may not also specify other network devices (i.e., edge and/or non-edge devices) (aside from the third edge device), which may reside in the first abstracted subarea complement. Any of these other network devices may be an abstracted subarea representation node should the traversal path extend through any non-first abstracted subareas (within the first abstracted subarea complement of the network area). Each of these abstracted subarea representation nodes may refer to a virtual network device that may be used as an abstraction of a respective logical portion (or subset) of the network area—i.e., in the aforementioned case, a virtual network device abstracting a subarea nested within the first abstracted subarea complement (if any).

In Step 408, based on the traversal path (selected in Step 406 or Step 412), the first edge device routes the network traffic data unit (received in Step 400) towards the network traffic data unit destination.

In Step 410, upon alternatively determining (in Step 402) that the destination of the network traffic data unit (received in Step 400) is reachable within the first abstracted subarea of the network area, the first edge device identifies a network device (i.e., a third edge device or a non-edge device). In one or more embodiments, the network device may reside in the first abstracted subarea and, more specifically, may be neighbor adjacent (or a next hop) to the destination of the network traffic data unit. Further, identification of the network device may entail the first edge device using its first abstracted subarea link state database to select a first abstracted subarea device along a shortest-path route to the destination of the network traffic data unit.

In Step 412, the first edge device selects a traversal path that leads to the network device (identified in Step 410). In one or more embodiments, the traversal path may specify other network devices (i.e., edge and/or non-edge devices) (aside from the identified network device), which may also reside in the first abstracted subarea. Further, should the traversal path extend through one or more abstracted subareas nested within the first abstracted subarea (see e.g., FIG. 7), then the subset of other network devices, specified by the traversal path, may include one or more abstracted subarea representation nodes, respectively. Each abstracted subarea representation node may refer to a virtual network device that may be used as an abstraction of a respective logical portion (or subset) of the network area—i.e., in the aforementioned case, a virtual network device abstracting a subarea nested within the first abstracted subarea (if any). Moreover, once the first edge device selects the traversal path, the process proceeds to Step 408, where the first edge device subsequently routes the network traffic data unit, based on the selected traversal path, towards the network traffic data unit destination.

FIG. 5 shows an exemplary scenario in accordance with one or more embodiments. Specifically, the following exemplary scenario is directed to the routing of network traffic through a network area that includes a single abstracted subarea. Further, the following exemplary scenario, presented in conjunction with components shown in FIG. 5, is for explanatory purposes only and not intended to limit the scope.

Turning to FIG. 5, an exemplary network area (500) is shown, which may represent a logical subset of a network or network topology (not shown). The network area (500) may be implemented through any number of interconnected network devices and/or other devices (i.e., non-network devices) (e.g., computing devices)—each of which may reside within either an abstracted subarea (502) or an abstracted subarea complement (504). The former may represent a logical subset of the network area (500), whereas the latter may refer to a remainder of the network area (500) that excludes the abstracted subarea (502).

Within the abstracted subarea (502), any number of network devices and/or other devices may reside, including an abstracted subarea leader (L) (506), a first edge network device (ED-1) (508A), a fourth edge network device (ED-4) (508D), a non-edge network device (D) (512), and a first network traffic destination (e.g., a first destination computing device) (T-1) (514A). Meanwhile, within the abstracted subarea complement (504), any number of network devices and/or other devices may reside, including a second edge network device (ED-2) (508B), a third edge network device (ED-3) (508C), a network traffic source (e.g., a source computing device) (S) (510), and a second network traffic destination (e.g., a second destination computing device) (T-2) (514B). Furthermore, each little box (□) interposed between any two of the aforementioned components may represent zero or more prospective non-edge network devices operatively connecting the any two components.

Turning to the exemplary scenario, the following two processes are detailed below, in view of one or more embodiments described herein: (a) a routing of a first network traffic data unit from the network traffic source (S) (510) to the first network traffic destination (T-1) (514A); and (b) a routing of a second network traffic data unit from the network traffic source (S) (510) to the second network traffic destination (T-2) (514B). The aforementioned two processes are described from the perspective of the first edge network device (ED-1) (508A) residing in the abstracted subarea (502).

Routing of First Network Traffic Data Unit

The first edge network device (ED-1) (508A) receives the first network traffic data unit from the second edge network device (ED-2) (508B). The first edge network device (ED-1) (508A) examines header information of the first network traffic data unit and identifies a first destination address (i.e., for the first network traffic destination (T-1) (514A)), which at least specifies a first subarea identifier and a system identifier. Through comparison, the first edge network device (ED-1) (508A) determines that the first subarea identifier matches a second subarea identifier assigned to the abstracted subarea (502). Based on the determination, the first edge network device (ED-1) (508A) uses the system identifier, in conjunction with its abstracted subarea link state database (not shown), to identify the non-edge network device (D) (512), which is adjacent to the first network traffic destination (T-1) (514A). Further, the first edge network device (ED-1) (508A) selects a traversal path leading to the non-edge network device (D) (512) and including zero or more other non-edge network devices (□) interposed between the non-edge network device (D) (512) and itself. The first edge network device (ED-1) (508A) then routes the first network traffic data unit based on the selected traversal path.

Routing of Second Network Traffic Data Unit

The first edge network device (ED-1) (508A) receives the second network traffic data unit from the second edge network device (ED-2) (508B). The first edge network device (ED-1) (508A) examines header information of the second network traffic data unit and identifies a second destination address (i.e., for the second network traffic destination (T-2) (514B)), which at least specifies a first subarea identifier and a system identifier. Through comparison, the first edge network device (ED-1) (508A) determines that the first subarea identifier mismatches a second subarea identifier assigned to the abstracted subarea (502). Based on the determination, the first edge network device (ED-1) (508A) uses the first subarea identifier, in conjunction with its abstracted subarea complement link state database (not shown), to identify the third edge network device (ED-3) (508C), which represents an abstracted subarea complement adjacency closest to the second network traffic destination (T-2) (514B). Further, the first edge network device (ED-1) (508A) selects a traversal path leading to the third edge network device (ED-3) (508C) and including: (a) the fourth edge network device (ED-4) (508D), which is neighbor adjacent to the third edge network device (ED-3) (508C); and (b) zero or more non-edge network devices (□) interposed between the fourth edge network device (ED-4) (508D) and itself. The first edge network device (ED-1) (508A) then routes the second network traffic data unit based on the selected traversal path.

Figure 6:
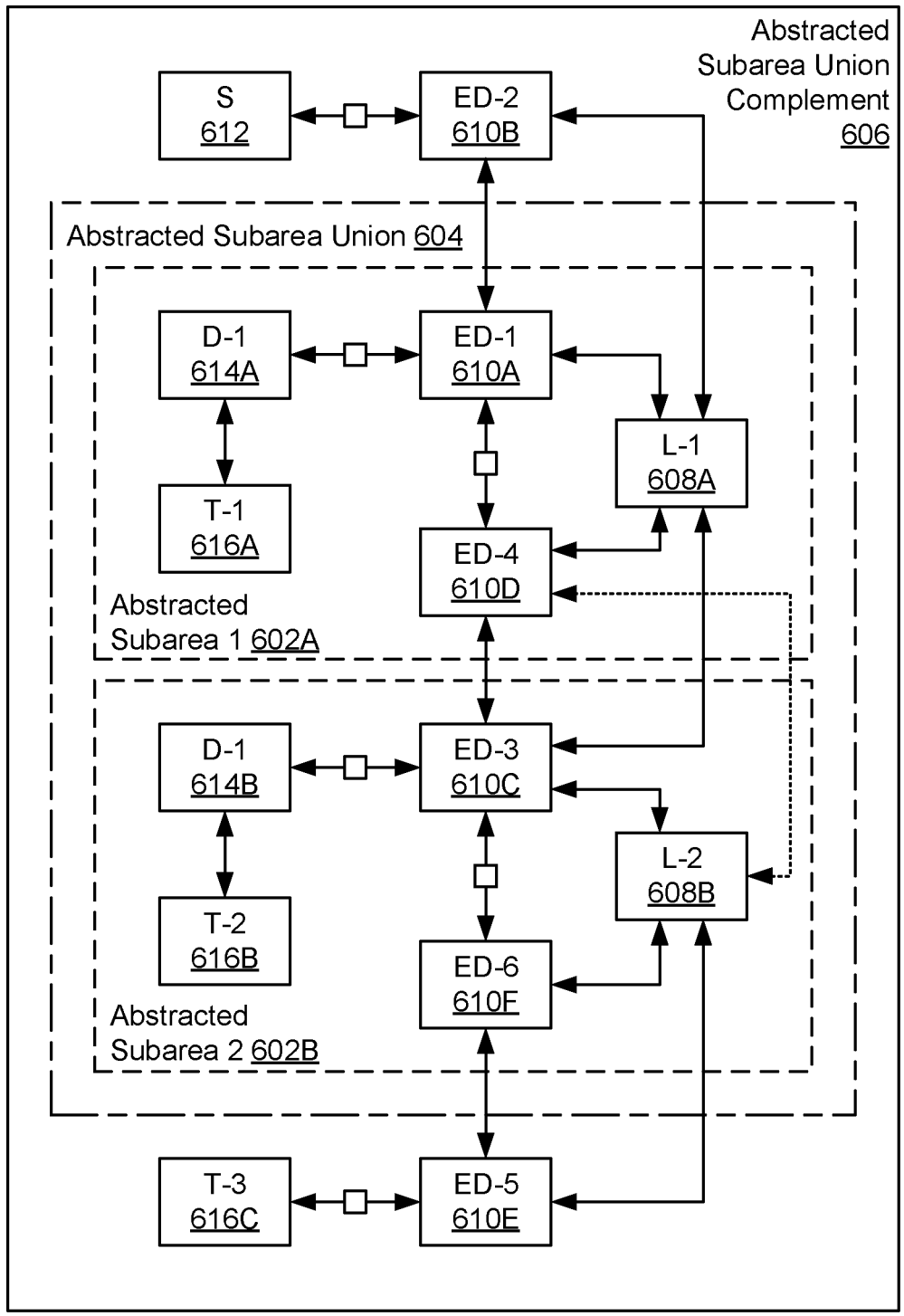
FIG. 6 shows an exemplary scenario in accordance with one or more embodiments.

FIG. 6 shows an exemplary scenario in accordance with one or more embodiments. Specifically, the following exemplary scenario is directed to the routing of network traffic through a network area that includes multiple abstracted subareas. Further, the following exemplary scenario, presented in conjunction with components shown in FIG. 6, is for explanatory purposes only and not intended to limit the scope.

Turning to FIG. 6, an exemplary network area (600) is shown, which may represent a logical subset of a network or network topology (not shown). The network area (600) may be implemented through any number of interconnected network devices and/or other devices (i.e., non-network devices) (e.g., computing devices)—each of which may reside within a first abstracted subarea (602A), a second abstracted subarea (602B), or an abstracted subarea union complement (606). The first and second abstracted subareas (602A, 602B) may collectively be referred to as an abstracted subarea union (604). Further, the first and second abstracted subareas (602A, 602B) may represent first and second logical subsets of the network area (600), respectively, whereas the abstracted subarea union complement (606) may refer to a remainder of the network area (600) that excludes the abstracted subarea union (604).

Within the first abstracted subarea (602A), any number of network devices and/or other devices may reside, including a first abstracted subarea leader (L-1) (608A), a first edge network device (ED-1) (610A), a fourth edge network device (ED-4) (610D), a first non-edge network device (D-1) (614A), and a first network traffic destination (e.g., a first destination computing device) (T-1) (616A). Further, within the second abstracted subarea (602B), any number of network devices and/or other devices may reside, including a second abstracted subarea leader (L-2) (608B), a third edge network device (ED-3) (610C), a sixth edge network device (ED-6) (610F), a second non-edge network device (D-2) (614B), and a second network traffic destination (e.g., a second destination computing device) (T-2) (616B). Meanwhile, within the abstracted subarea union complement (606), any number of network devices and/or other devices may reside, including a second edge network device (ED-2) (610B), a fifth edge network device (ED-5) (610E), a network traffic source (e.g., a source computing device) (S) (612), and a third network traffic destination (e.g., a third destination computing device) (T-3) (616C). Furthermore, each little box (□) interposed between any two of the aforementioned components may represent zero or more prospective non-edge network devices operatively connecting the any two components.

Turning to the exemplary scenario, the following three processes are detailed below, in view of one or more embodiments described herein: (a) a routing of a first network traffic data unit from the network traffic source (S) (612) to the first network traffic destination (T-1) (616A); (b) a routing of a second network traffic data unit from the network traffic source (S) (612) to the second network traffic destination (T-2) (616B); and (c) a routing of a third network traffic data unit from the network traffic source (S) (612) to the third network traffic destination (T-3) (616C). The aforementioned three processes are described from the perspective of the first edge network device (ED-1) (610A) residing in the first abstracted subarea (602A).

Routing of First Network Traffic Data Unit

The first edge network device (ED-1) (610A) receives the first network traffic data unit from the second edge network device (ED-2) (610B). The first edge network device (ED-1) (610A) examines header information of the first network traffic data unit and identifies a first destination address (i.e., for the first network traffic destination (T-1) (616A)), which at least specifies a first subarea identifier and a system identifier. Through comparison, the first edge network device (ED-1) (610A) determines that the first subarea identifier matches a second subarea identifier assigned to the first abstracted subarea (602A). Based on the determination, the first edge network device (ED-1) (610A) uses the system identifier, in conjunction with its first abstracted subarea link state database (not shown), to identify the first non-edge network device (D-1) (614A), which is adjacent to the first network traffic destination (T-1) (616A). Further, the first edge network device (ED-1) (610A) selects a traversal path leading to the first non-edge network device (D-1) (614A) and including zero or more other non-edge network devices (□) interposed between the first non-edge network device (D-1) (614A) and itself The first edge network device (ED-1) (610A) then routes the first network traffic data unit based on the selected traversal path.

Routing of Second Network Traffic Data Unit

The first edge network device (ED-1) (610A) receives the second network traffic data unit from the second edge network device (ED-2) (610B). The first edge network device (ED-1) (610A) examines header information of the second network traffic data unit and identifies a second destination address (i.e., for the second network traffic destination (T-2) (616B)), which at least specifies a first subarea identifier and a system identifier. Through comparison, the first edge network device (ED-1) (610A) determines that the first subarea identifier mismatches a second subarea identifier assigned to the first abstracted subarea (602A). Based on the determination, the first edge network device (ED-1) (610A) uses the first subarea identifier, in conjunction with its first abstracted subarea complement (i.e., second abstracted subarea (602B)+abstracted subarea union complement (606)) link state database (not shown), to identify the third edge network device (ED-3) (610C), which represents a first abstracted subarea complement adjacency closest to the second network traffic destination (T-2) (616B). Further, the first edge network device (ED-1) (610A) selects a first traversal path leading to the third edge network device (ED-3) (610C) and including: (a) the fourth edge network device (ED-4) (610D), which is neighbor adjacent to the third edge network device (ED-3) (610C); and (b) a first set of zero or more non-edge network devices (□) interposed between the fourth edge network device (ED-4) (610D) and itself. The first edge network device (ED-1) (610A) then routes the second network traffic data unit based on the selected first traversal path.

From here, the third edge network device (ED-3) (610C) receives the second network traffic data unit from the fourth edge network device (ED-4) (610D). The third edge network device (ED-3) (610C) examines header information of the second network traffic data unit and identifies the second destination address, which at least specifies the first subarea identifier and the system identifier. Through comparison, the third edge network device (ED-3) (610C) determines that the first subarea identifier matches a third subarea identifier assigned to the second abstracted subarea (602B). Based on the determination, the third edge network device (ED-3) (610C) uses the system identifier, in conjunction with its second abstracted subarea link state database (not shown), to identify the second non-edge network device (D-2) (614B), which is adjacent to the second network traffic destination (T-2) (616B). Further, the third edge network device (ED-3) (610C) selects a second traversal path leading to the second non-edge network device (D-2) (614B) and including a second set of zero or more other non-edge network devices (□) interposed between the second non-edge network device (D-2) (614B) and itself. The third edge network device (ED-3) (610B) then routes the second network traffic data unit based on the selected second traversal path.

Routing of Third Network Traffic Data Unit

The first edge network device (ED-1) (610A) receives the third network traffic data unit from the second edge network device (ED-2) (610B). The first edge network device (ED-1) (610A) examines header information of the third network traffic data unit and identifies a third destination address (i.e., for the third network traffic destination (T-3) (616C)), which at least specifies a first subarea identifier and a system identifier. Through comparison, the first edge network device (ED-1) (610A) determines that the first subarea identifier mismatches a second subarea identifier assigned to the first abstracted subarea (602A). Based on the determination, the first edge network device (ED-1) (610A) uses the first subarea identifier, in conjunction with its first abstracted subarea complement (i.e., second abstracted subarea (602B)+abstracted subarea union complement (606)) link state database (not shown), to identify the fifth edge network device (ED-5) (508E), which represents a first abstracted subarea complement adjacency closest to the third network traffic destination (T-3) (616C).

Further, the first edge network device (ED-1) (610A) selects a traversal path leading to the fifth edge network device (ED-5) (610E) and including: (a) a second abstracted subarea (602B) representation node (not shown), which the first edge network device (ED-1) (610A) perceives is neighbor adjacent to the fifth edge network device (ED-5) (610E); (b) the fourth edge network device (ED-4) (610D), which is neighbor adjacent to the second abstracted subarea (602B) representation node; and (c) zero or more non-edge network devices (□) interposed between the fourth edge network device (ED-4) (610D) and itself. The first edge network device (ED-1) (610A) then routes the third network traffic data unit based on the selected traversal path. The aforementioned second abstracted subarea (602B) representation node may reference a virtual network device representative of the second abstracted subarea (602B) topology.

Figure 7:
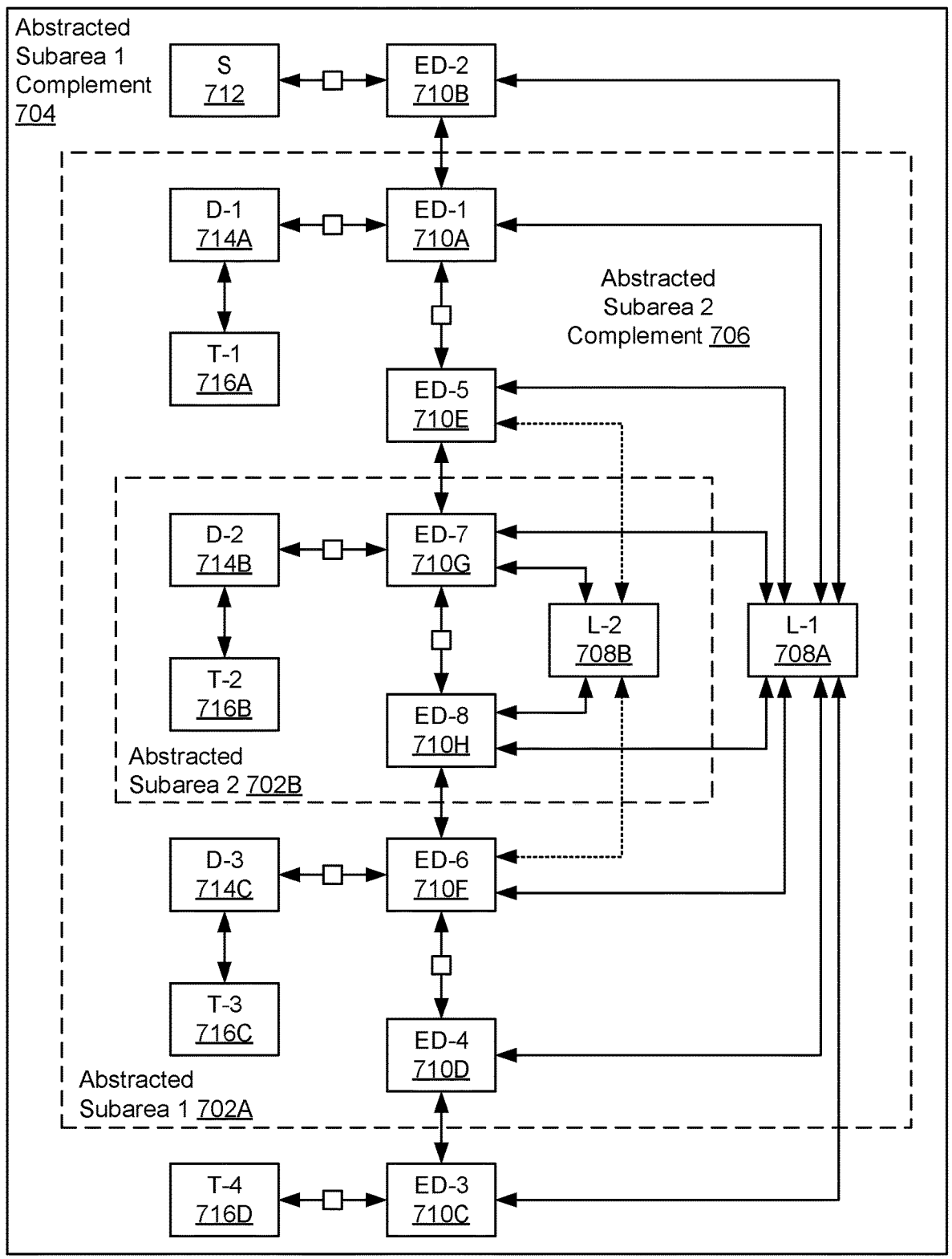
FIG. 7 shows an exemplary scenario in accordance with one or more embodiments.

FIG. 7 shows an exemplary scenario in accordance with one or more embodiments. Specifically, the following exemplary scenario is directed to the routing of network traffic through a network area that includes multiple nested abstracted subareas. Further, the following exemplary scenario, presented in conjunction with components shown in FIG. 7, is for explanatory purposes only and not intended to limit the scope.

Turning to FIG. 7, an exemplary network area (700) is shown, which may represent a logical subset of a network or network topology (not shown). The network area (700) may be implemented through any number of interconnected network devices and/or other devices (i.e., non-network devices) (e.g., computing devices)—each of which may reside within a second abstracted subarea (702B), a second abstracted subarea complement (706), or a first abstracted subarea complement (704). The second abstracted subarea (702B) and second abstracted subarea complement (706) may collectively form and be referred to as a first abstracted subarea (702A). Further, the second abstracted subarea (702B) may represent a logical subset of the first abstracted subarea (702A), whereas the second abstracted subarea complement (706) may refer to a remainder of the first abstracted subarea (702A) that excludes the second abstracted subarea (702B) nested therein. Moreover, the first abstracted subarea (702A) may represent a logical subset of the network area (700), whereas the first abstracted subarea complement (704) may refer to a remainder of the network area (700) that excludes the first abstracted subarea (702A).

Within the second abstracted subarea (702B), any number of network devices and/or other devices may reside, including a second abstracted subarea leader (L-2) (708B), a seventh edge network device (ED-7) (710G), an eighth edge network device (ED-8) (710H), a second non-edge network device (D-2) (714B), and a second network traffic destination (e.g., a second destination computing device) (T-2) (716B). Further, within the second abstracted subarea complement (706), any number of network devices and/or other devices may reside, including a first edge network device (ED-1) (710A), a fourth edge network device (ED-4) (710D), a fifth edge network device (ED-5) (710E), a sixth edge network device (ED-6) (710F), a first non-edge network device (D-1) (714A), a third non-edge network device (D-3) (714C), a first network traffic destination (e.g., a first destination computing device) (T-1) (716A), and a third network traffic destination (e.g., a third destination computing device) (T-3) (716C). Meanwhile, within the first abstracted subarea complement (704), any number of network devices and/or other devices may reside, including a second edge network device (ED-2) (710B), a third edge network device (ED-3) (710C), a network traffic source (e.g., a source computing device) (S) (712), and a fourth network traffic destination (e.g., a fourth destination computing device) (T-4) (716D). Furthermore, each little box (□) interposed between any two of the aforementioned components may represent zero or more prospective non-edge network devices operatively connecting the any two components.

Turning to the exemplary scenario, the following four processes are detailed below, in view of one or more embodiments described herein: (a) a routing of a first network traffic data unit from the network traffic source (S) (712) to the first network traffic destination (T-1) (716A); (b) a routing of a second network traffic data unit from the network traffic source (S) (712) to the second network traffic destination (T-2) (716B); (c) a routing of a third network traffic data unit from the network traffic source (S) (712) to the third network traffic destination (T-3) (716C); and (d) a routing of a fourth network traffic data unit from the network traffic source (S) (712) to the fourth network traffic destination (T-4) (716D). The aforementioned four processes are described from the perspective of the first edge network device (ED-1) (710A) residing in the second abstracted subarea complement (706) portion of the first abstracted subarea (702A).

Routing of First Network Traffic Data Unit

The first edge network device (ED-1) (710A) receives the first network traffic data unit from the second edge network device (ED-2) (710B). The first edge network device (ED-1) (710A) examines header information of the first network traffic data unit and identifies a first destination address (i.e., for the first network traffic destination (T-1) (716A)), which at least specifies a first subarea identifier and a system identifier. Through comparison, the first edge network device (ED-1) (710A) determines that the first subarea identifier matches a second subarea identifier assigned to the second abstracted subarea complement (706) portion of the first abstracted subarea (702A). Based on the determination, the first edge network device (ED-1) (710A) uses the system identifier, in conjunction with its first abstracted subarea link state database (not shown), to identify the first non-edge network device (D-1) (714A), which is adjacent to the first network traffic destination (T-1) (716A). Further, the first edge network device (ED-1) (710A) selects a traversal path leading to the first non-edge network device (D-1) (714A) and including zero or more other non-edge network devices (□) interposed between the first non-edge network device (D-1) (714A) and itself. The first edge network device (ED-1) (710A) then routes the first network traffic data unit based on the selected traversal path.

Routing of Second Network Traffic Data Unit

The first edge network device (ED-1) (710A) receives the second network traffic data unit from the second edge network device (ED-2) (710B). The first edge network device (ED-1) (710A) examines header information of the second network traffic data unit and identifies a second destination address (i.e., for the second network traffic destination (T-2) (716B)), which at least specifies a first subarea identifier and a system identifier. Through comparison, the first edge network device (ED-1) (710A) determines that the first subarea identifier mismatches a second subarea identifier assigned to the second abstracted subarea complement (706) portion of the first abstracted subarea (702A). Based on the determination, the first edge network device (ED-1) (710A) uses the first subarea identifier, in conjunction with its first abstracted subarea complement (704) and second abstracted subarea (702B) link state databases (not shown), to identify the seventh edge network device (ED-7) (710G), which represents a second abstracted subarea adjacency closest to the second network traffic destination (T-2) (716B). Further, the first edge network device (ED-1) (710A) selects a first traversal path leading to the seventh edge network device (ED-7) (710G) and including: (a) the fifth edge network device (ED-5) (710E), which is neighbor adjacent to the seventh edge network device (ED-7) (710G); and (b) a first set of zero or more non-edge network devices (□) interposed between the fifth edge network device (ED-5) (710E) and itself. The first edge network device (ED-1) (710A) then routes the second network traffic data unit based on the selected first traversal path.

From here, the seventh edge network device (ED-7) (710G) receives the second network traffic data unit from the fifth edge network device (ED-5) (710E). The seventh edge network device (ED-7) (710G) examines header information of the second network traffic data unit and identifies the second destination address, which at least specifies the first subarea identifier and the system identifier. Through comparison, the seventh edge network device (ED-7) (710G) determines that the first subarea identifier matches a third subarea identifier assigned to the second abstracted subarea (702B). Based on the determination, the seventh edge network device (ED-7) (710G) uses the system identifier, in conjunction with its second abstracted subarea link state database (not shown), to identify the second non-edge network device (D-2) (714B), which is adjacent to the second network traffic destination (T-2) (716B). Further, the seventh edge network device (ED-7) (710G) selects a second traversal path leading to the second non-edge network device (D-2) (714B) and including a second set of zero or more other non-edge network devices (□) interposed between the second non-edge network device (D-2) (714B) and itself. The seventh edge network device (ED-7) (710G) then routes the second network traffic data unit based on the selected second traversal path.

Routing of Third Network Traffic Data Unit

The first edge network device (ED-1) (710A) receives the third network traffic data unit from the second edge network device (ED-2) (710B). The first edge network device (ED-1) (710A) examines header information of the third network traffic data unit and identifies a third destination address (i.e., for the third network traffic destination (T-3) (716C)), which at least specifies a first subarea identifier and a system identifier. Through comparison, the first edge network device (ED-1) (710A) determines that the first subarea identifier matches a second subarea identifier assigned to the second abstracted subarea complement (706) portion of the first abstracted subarea (702A). Based on the determination, the first edge network device (ED-1) (710A) uses the system identifier, in conjunction with its first abstracted subarea link state database (not shown), to identify the third non-edge network device (D-3) (714C), which is adjacent to the third network traffic destination (T-3) (716C).

Further, the first edge network device (ED-1) (710A) selects a traversal path leading to the third non-edge network device (D-3) (714C) and including: (a) the sixth edge network device (ED-6) (710F), which is neighbor adjacent to the third non-edge network device (D-3) (714C); (b) a second abstracted subarea (702B) representation node (not shown), which the first edge network device (ED-1) (710A) perceives is neighbor adjacent to the sixth edge network device (ED-6) (710F); (c) the fifth edge network device (ED-5), which is neighbor adjacent to the second abstracted subarea (702B) representation node; and (d) zero or more other non-edge network devices (□) interposed between the fifth edge network device (ED-5) (710E) and itself. The first edge network device (ED-1) (710A) then routes the third network traffic data unit based on the selected traversal path. The aforementioned second abstracted subarea (702B) representation node may reference a virtual network device representative of the second abstracted subarea (702B) topology nested within the first abstracted subarea (702A).

Routing of Fourth Network Traffic Data Unit

The first edge network device (ED-1) (710A) receives the fourth network traffic data unit from the second edge network device (ED-2) (710B). The first edge network device (ED-1) (710A) examines header information of the fourth network traffic data unit and identifies a fourth destination address (i.e., for the fourth network traffic destination (T-4) (716D)), which at least specifies a first subarea identifier and a system identifier. Through comparison, the first edge network device (ED-1) (710A) determines that the first subarea identifier mismatches a second subarea identifier assigned to the second abstracted subarea complement (706) portion of the first abstracted subarea (702A). Based on the determination, the first edge network device (ED-1) (710A) uses the first subarea identifier, in conjunction with its first abstracted subarea complement (704) and second abstracted subarea (702B) link state databases (not shown), to identify the third edge network device (ED-3) (710C), which represents a first abstracted subarea complement adjacency closest to the fourth network traffic destination (T-4) (716D).

Further, the first edge network device (ED-1) (710A) selects a traversal path leading to the third edge network device (ED-3) (710C) and including: (a) the fourth edge network device (ED-4) (710D), which is neighbor adjacent to the third edge network device (ED-3) (710C); (b) the sixth edge network device (ED-6) (710F); (c) a first set of zero or more non-edge network devices (□) interposed between the fourth and sixth edge network devices (ED-4, ED-6) (710D, 710F); (c) a second abstracted subarea (702B) representation node (not shown), which the first edge network device (ED-1) (710A) perceives is neighbor adjacent to the sixth edge network device (ED-6) (710F); (d) the fifth edge network device (ED-5), which is neighbor adjacent to the second abstracted subarea (702B) representation node; and (e) a second set of zero or more non-edge network devices (□) interposed between the fifth edge network device (ED-5) (710E) and itself. The first edge network device (ED-1) (710A) then routes the fourth network traffic data unit based on the selected traversal path. The aforementioned second abstracted subarea (702B) representation node may reference a virtual network device representative of the second abstracted subarea (702B) topology nested within the first abstracted subarea (702A).

While the technology has been described with respect to a limited number of embodiments, those skilled in the art, having benefit of this disclosure, will appreciate that other embodiments can be devised which do not depart from the scope as disclosed herein. Accordingly, the scope should be limited only by the attached claims.

What is claimed is:

1. A method for routing protocol subarea abstraction, comprising:
  electing a first abstracted subarea leader from among a plurality of network devices in a network area of a network,
    wherein the network area is one level of a hierarchy of the network,
    wherein the network area comprises a first abstracted subarea and a first abstracted subarea complement,
    wherein the first abstracted subarea comprises a subset of the plurality of network devices in the network area,
    wherein the subset of the plurality of network devices comprises the first abstracted subarea leader and a plurality of first abstracted subarea edge devices;
  generating, by the first abstracted subarea leader, a first abstracted subarea representation node identifier associated with the first abstracted subarea,
    wherein the first abstracted subarea representation node identifier identifies a first abstracted subarea representation node used to represent the first abstracted subarea;
  distributing, by the first abstracted subarea leader, the first abstracted subarea representation node identifier to the plurality of first abstracted subarea edge devices,
    wherein distributing the first abstracted subarea representation node identifier to the first abstracted subarea edge devices triggers each first abstracted subarea edge device to determine a portion of the first abstracted subarea complement to which they are adjacent;
  receiving, by the first abstracted subarea leader and from the plurality of first abstracted subarea edge devices, a plurality of first abstracted subarea link state packets (LSPs) in response to distributing the first abstracted subarea representation node identifier,
    wherein a first abstracted subarea LSP from a first abstracted subarea edge device comprises the first abstracted subarea representation node identifier and the portion of the first abstracted subarea complement to which the first abstracted subarea edge device is adjacent;
  generating, by the first abstracted subarea leader and using the plurality of first abstracted subarea LSPs, a first abstracted subarea representation node LSP,
    wherein the first abstracted subarea representation node LSP comprises the first abstracted subarea representation node identifier and a plurality of first abstracted subarea neighbor adjacencies between the plurality of first abstracted subarea edge devices and the first abstracted subarea complement; and
  distributing, by the first abstracted subarea leader, the first abstracted subarea representation node LSP to a first plurality of first abstracted subarea complement network devices, wherein, in response to receiving a copy of the first abstracted subarea representation node LSP, each of the first plurality of first abstracted subarea complement network devices advertises an adjacency to the first abstracted subarea representation node to a second plurality of first abstracted subarea complement network devices.

2. The method of claim 1, further comprising:
electing a second abstracted subarea leader from among a second abstracted subarea,
   wherein the first abstracted subarea further comprises the second abstracted subarea and a second abstracted subarea complement,
   wherein the second abstracted subarea comprises a subset of the network devices in the first abstracted subarea,
   wherein the subset of the network devices in the first abstracted subarea comprises the second abstracted subarea leader and a plurality of second abstracted subarea edge devices;
generating, by the second abstracted subarea leader, a second abstracted subarea representation node identifier associated with the second abstracted subarea,
   wherein the second abstracted subarea representation node identifier identifies a second abstracted subarea representation node used to represent the second abstracted subarea;
distributing, by the second abstracted subarea leader, the second abstracted subarea representation node identifier to the plurality of second abstracted subarea edge devices,
   wherein distributing the second abstracted subarea representation node identifier to the plurality of second abstracted subarea edge devices triggers each second abstracted subarea edge device to determine a portion of the second abstracted subarea complement to which they are adjacent;
receiving, by the second abstracted subarea leader and from the plurality of second abstracted subarea edge devices, a plurality of second abstracted subarea LSPs in response to distributing the second abstracted subarea representation node identifier,
   wherein a second abstracted subarea LSP from a second abstracted subarea edge device comprises the second abstracted subarea representation node identifier and the portion of the second abstracted subarea complement to which the second abstracted subarea edge device is adjacent;
generating, by the second abstracted subarea leader and using the plurality of second abstracted subarea LSPs, a second abstracted subarea representation node LSP,
   wherein the second abstracted subarea representation node LSP comprises the second abstracted subarea representation node identifier and a plurality of second abstracted subarea neighbor adjacencies between the second abstracted subarea edge devices and the second abstracted subarea complement; and
distributing, by the second abstracted subarea leader, the second abstracted subarea representation node LSP to a first plurality of second abstracted subarea complement network devices,
   wherein, in response to receiving a copy of the second abstracted subarea representation node LSP, each of the first plurality of second abstracted subarea complement network devices advertises an adjacency to the second abstracted subarea representation node to a second plurality of second abstracted subarea complement network devices.

3. The method of claim 1, wherein the first abstracted subarea representation node is a virtual network device.

4. The method of claim 1, wherein the first abstracted subarea leader is a network device of the plurality of network devices in the network area that advertised a highest leader priority.

5. The method of claim 1, wherein distributing the first abstracted subarea representation node identifier to the plurality of first abstracted subarea edge devices, comprises:
   transmitting a copy of another first abstracted subarea LSP to each first abstracted subarea edge device,
   wherein the first abstracted subarea representation node identifier is maintained in a type-length-value (TLV) encoded portion of the other first abstracted subarea LSP.

6. The method of claim 1, further comprising:
   making a determination that the first abstracted subarea leader has failed;
   electing a new first abstracted subarea leader from among the plurality of network devices in the network area excluding the first abstracted subarea leader;
   generating, by the new first abstracted subarea leader, a new first abstracted subarea representation node LSP; and
   distributing, by the new first abstracted subarea leader, the new first abstracted subarea representation node LSP to the first plurality of first abstracted subarea complement network devices.

7. The method of claim 1, wherein the first abstracted subarea leader and each of the plurality of first abstracted subarea edge devices are operatively connected to both the first abstracted subarea and the first abstracted subarea complement, within the network area.

8. A non-transitory computer readable medium (CRM) comprising computer readable program code, which when executed by a computer processor, enables the computer processor to:
   elect a first abstracted subarea leader from among a plurality of network devices in a network area of a network,
      wherein the network area is one level of a hierarchy of the network,
      wherein the network area comprises a first abstracted subarea and a first abstracted subarea complement,
      wherein the first abstracted subarea comprises a subset of the plurality of network devices in the network area,
      wherein the subset of the plurality of network devices comprises the first abstracted subarea leader and a plurality of first abstracted subarea edge devices;
   generate, by the first abstracted subarea leader, a first abstracted subarea representation node identifier associated with the first abstracted subarea,
      wherein the first abstracted subarea representation node identifier identifies a first abstracted subarea representation node used to represent the first abstracted subarea;
   distribute, by the first abstracted subarea leader, the first abstracted subarea representation node identifier to the plurality of first abstracted subarea edge devices,
      wherein distributing the first abstracted subarea representation node identifier to the first abstracted subarea edge devices triggers each first abstracted subarea edge device to determine a portion of the first abstracted subarea complement to which they are adjacent;

receive, by the first abstracted subarea leader and from the plurality of first abstracted subarea edge devices, a plurality of first abstracted subarea link state packets (LSPs) in response to distributing the first abstracted subarea representation node identifier,
   wherein a first abstracted subarea LSP from a first abstracted subarea edge device comprises the first abstracted subarea representation node identifier and the portion of the first abstracted subarea complement to which the first abstracted subarea edge device is adjacent;

generate, by the first abstracted subarea leader and using the plurality of first abstracted subarea LSPs, a first abstracted subarea representation node LSP,
   wherein the first abstracted subarea representation node LSP comprises the first abstracted subarea representation node identifier and a plurality of first abstracted subarea neighbor adjacencies between the plurality of first abstracted subarea edge devices and the first abstracted subarea complement; and distribute, by the first abstracted subarea leader, the first abstracted subarea representation node LSP to a first plurality of first abstracted subarea complement network devices,
   wherein, in response to receiving a copy of the first abstracted subarea representation node LSP, each of the first plurality of first abstracted subarea complement network devices advertises an adjacency to the first abstracted subarea representation node to a second plurality of first abstracted subarea complement network devices.

9. The non-transitory CRM of claim 8, comprising computer readable program code, which when executed by the computer processor, further enables the computer processor to:

elect a second abstracted subarea leader from among a second abstracted subarea,
   wherein the first abstracted subarea further comprises the second abstracted subarea and a second abstracted subarea complement,
   wherein the second abstracted subarea comprises a subset of the network devices in the first abstracted subarea,
   wherein the subset of the network devices in the first abstracted subarea comprises the second abstracted subarea leader and a plurality of second abstracted subarea edge devices;

generate, by the second abstracted subarea leader, a second abstracted subarea representation node identifier associated with the second abstracted subarea,
   wherein the second abstracted subarea representation node identifier identifies a second abstracted subarea representation node used to represent the second abstracted subarea;

distribute, by the second abstracted subarea leader, the second abstracted subarea representation node identifier to the plurality of second abstracted subarea edge devices,
   wherein distributing the second abstracted subarea representation node identifier to the plurality of second abstracted subarea edge devices triggers each second abstracted subarea edge device to determine a portion of the second abstracted subarea complement to which they are adjacent;

receive, by the second abstracted subarea leader and from the plurality of second abstracted subarea edge devices, a plurality of second abstracted subarea LSPs in response to distributing the second abstracted subarea representation node identifier,
   wherein a second abstracted subarea LSP from a second abstracted subarea edge device comprises the second abstracted subarea representation node identifier and the portion of the second abstracted subarea complement to which the second abstracted subarea edge device is adjacent;

generate, by the second abstracted subarea leader and using the plurality of second abstracted subarea LSPs, a second abstracted subarea representation node LSP,
   wherein the second abstracted subarea representation node LSP comprises the second abstracted subarea representation node identifier and a plurality of second abstracted subarea neighbor adjacencies between the second abstracted subarea edge devices and the second abstracted subarea complement; and distribute, by the second abstracted subarea leader, the second abstracted subarea representation node LSP to a first plurality of second abstracted subarea complement network devices,
   wherein, in response to receiving a copy of the second abstracted subarea representation node LSP, each of the first plurality of second abstracted subarea complement network devices advertises an adjacency to the second abstracted subarea representation node to a second plurality of second abstracted subarea complement network devices.

10. The non-transitory CRM of claim 8, wherein the first abstracted subarea representation node is a virtual network device.

11. The non-transitory CRM of claim 8, wherein the first abstracted subarea leader is a network device of the plurality of network devices in the network area that advertised a highest leader priority.

12. The non-transitory CRM of claim 8, comprising computer readable program code to distribute the first abstracted subarea representation node identifier to the plurality of first abstracted subarea edge devices, which when executed by the computer processor, enables the computer processor to:

transmit a copy of another first abstracted subarea LSP to each first abstracted subarea edge device,
   wherein the first abstracted subarea representation node identifier is maintained in a type-length-value (TLV) encoded portion of the other first abstracted subarea LSP.

13. The non-transitory CRM of claim 8, comprising computer readable program code, which when executed by the computer processor, further enables the computer processor to:

make a determination that the first abstracted subarea leader has failed;

elect a new first abstracted subarea leader from among the plurality of network devices in the network area excluding the first abstracted subarea leader;

generate, by the new first abstracted subarea leader, a new first abstracted subarea representation node LSP; and distribute, by the new first abstracted subarea leader, the new first abstracted subarea representation node LSP to the first plurality of first abstracted subarea complement network devices.

14. The non-transitory CRM of claim 8, wherein the first abstracted subarea leader and each of the plurality of first abstracted subarea edge devices are operatively connected to both the first abstracted subarea and the first abstracted subarea complement, within the network area.

15. A system, comprising:
a plurality of first abstracted subarea edge devices of a first abstracted subarea of a network area of a network, wherein the network area is one level of a hierarchy of the network;
a plurality of first abstracted subarea complement network devices of a first abstracted subarea complement of the network area; and
an elected first abstracted subarea leader operatively connected to the plurality of first abstracted subarea edge devices and the plurality of first abstracted subarea complement network devices, and comprising a first computer processor,
wherein the elected first abstracted subarea leader is programmed to:
generate a first abstracted subarea representation node identifier associated with the first abstracted subarea,
wherein the first abstracted subarea representation node identifier identifies a first abstracted subarea representation node used to represent the first abstracted subarea;
distribute the first abstracted subarea representation node identifier to the plurality of first abstracted subarea edge devices,
wherein distributing the first abstracted subarea representation node identifier to the first abstracted subarea edge devices triggers each first abstracted subarea edge device to determine a portion of the first abstracted subarea complement to which they are adjacent;
receive, from the plurality of first abstracted subarea edge devices, a plurality of first abstracted subarea link state packets (LSPs) in response to distributing the first abstracted subarea representation node identifier,
wherein a first abstracted subarea LSP from a first abstracted subarea edge device comprises the first abstracted subarea representation node identifier and the portion of the first abstracted subarea complement to which the first abstracted subarea edge device is adjacent;
generate, using the plurality of first abstracted subarea LSPs, a first abstracted subarea representation node LSP,
wherein the first abstracted subarea representation node LSP comprises the first abstracted subarea representation node identifier and a plurality of first abstracted subarea neighbor adjacencies between the plurality of first abstracted subarea edge devices and the first abstracted subarea complement; and
distribute the first abstracted subarea representation node LSP to the plurality of first abstracted subarea complement network devices,
wherein, in response to receiving a copy of the first abstracted subarea representation node LSP, each of the plurality of first abstracted subarea complement network devices advertises an adjacency to the first abstracted subarea representation node.

16. The system of claim 15, further comprising:
a plurality of second abstracted subarea edge devices of a second abstracted subarea of the network area, wherein the first abstracted subarea comprises the second abstracted subarea and a second abstracted subarea complement;
a plurality of second abstracted subarea complement network devices of the second abstracted subarea complement; and
an elected second abstracted subarea leader operatively connected to the plurality of second abstracted subarea edge devices and the plurality of second abstracted subarea complement network devices, and comprising a second computer processor,
wherein the elected second abstracted subarea leader is programmed to:
generate a second abstracted subarea representation node identifier associated with the second abstracted subarea,
wherein the second abstracted subarea representation node identifier identifies a second abstracted subarea representation node used to represent the second abstracted subarea;
distribute the second abstracted subarea representation node identifier to the plurality of second abstracted subarea edge devices,
wherein distributing the second abstracted subarea representation node identifier to the plurality of second abstracted subarea edge devices triggers each second abstracted subarea edge device to determine a portion of the second abstracted subarea complement to which they are adjacent;
receive, from the plurality of second abstracted subarea edge devices, a plurality of second abstracted subarea LSPs in response to distributing the second abstracted subarea representation node identifier,
wherein a second abstracted subarea LSP from a second abstracted subarea edge device comprises the second abstracted subarea representation node identifier and the portion of the second abstracted subarea complement to which the second abstracted subarea edge device is adjacent;
generate, using the plurality of second abstracted subarea LSPs, a second abstracted subarea representation node LSP,
wherein the second abstracted subarea representation node LSP comprises the second abstracted subarea representation node identifier and a plurality of second abstracted subarea neighbor adjacencies between the second abstracted subarea edge devices and the second abstracted subarea complement; and
distribute the second abstracted subarea representation node LSP to the plurality of second abstracted subarea complement network devices,
wherein, in response to receiving a copy of the second abstracted subarea representation node LSP, each of the plurality of second abstracted subarea complement network devices advertises an adjacency to the second abstracted subarea representation node.

17. The system of claim 15, wherein, to distribute the first abstracted subarea representation node identifier to the plurality of first abstracted subarea edge devices, the elected first abstracted subarea leader is further programmed to:
transmit a copy of another first abstracted subarea LSP to each first abstracted subarea edge device, wherein the first abstracted subarea representation node identifier is maintained in a type-length-value (TLV) encoded portion of the other first abstracted subarea LSP.

18. The system of claim 15, wherein the network area comprises a spine layer of the network, wherein the first abstracted subarea comprises a first subset of the spine layer, and wherein first abstracted subarea complement comprises a second subset of the spine layer that is mutually exclusive to the first subset.

19. The system of claim 15, wherein the network area comprises a leaf layer of the network, wherein the first abstracted subarea comprises a first subset of the leaf layer, and wherein the first abstracted subarea complement comprises a second subset of the leaf layer that is mutually exclusive to the first subset.

20. The system of claim 15, wherein the elected first abstracted subarea leader is a switch, a router, or a multilayer switch.

* * * * *